United States Patent
Loehr et al.

(10) Patent No.: US 10,993,253 B2
(45) Date of Patent: Apr. 27, 2021

(54) SCHEDULING REQUEST PROCEDURE FOR D2D COMMUNICATION

(71) Applicant: Sun Patent Trust, New York, NY (US)

(72) Inventors: Joachim Loehr, Wiesbaden (DE); Prateek Basu Mallick, Langen (DE)

(73) Assignee: Sun Patent Trust, New York, NY (US)

( * ) Notice: Subject to any disclaimer, the term of this patent is extended or adjusted under 35 U.S.C. 154(b) by 0 days.

(21) Appl. No.: 16/385,996

(22) Filed: Apr. 16, 2019

(65) Prior Publication Data

US 2019/0246418 A1  Aug. 8, 2019

Related U.S. Application Data

(63) Continuation of application No. 15/121,016, filed as application No. PCT/EP2015/051231 on Jan. 22, 2015, now Pat. No. 10,314,072.

(30) Foreign Application Priority Data

Mar. 21, 2014  (EP) .................................... 14001053

(51) Int. Cl.
   *H04W 72/12*  (2009.01)
   *H04W 76/14*  (2018.01)

(52) U.S. Cl.
   CPC ....... *H04W 72/1284* (2013.01); *H04W 76/14* (2018.02); *H04W 72/1236* (2013.01)

(58) Field of Classification Search
   None
   See application file for complete search history.

(56) References Cited

U.S. PATENT DOCUMENTS 8,107,883 B2  1/2012  Peng et al.
8,116,392 B2  2/2012  Ihm et al.
         (Continued)

FOREIGN PATENT DOCUMENTS

CN  102246575 A  11/2011
CN  102334370 A  1/2012
         (Continued)

OTHER PUBLICATIONS

Ericsson, "Overview of MAC functionality for D2D Communication," Tdoc R2-134236, Agenda Item: 7.5.3.1, 3GPP TSG-RAN WG2 #84, San Francisco, USA, Nov. 11-15, 2013, 6 pages.
         (Continued)

*Primary Examiner* — Chi H Pham
*Assistant Examiner* — Raul Rivas
(74) *Attorney, Agent, or Firm* — Seed IP Law Group LLP

(57) ABSTRACT

The present invention relates to a D2D capable a communication method and to a transmitting user equipment, which transmits data to a receiving user equipment over a direct link data channel, uses the services of the eNodeB in order to have resources allocated for transmitting said data. To this end the UE sends to the eNB scheduling information using resources of a subframe dedicated for standard uplink communication through the eNodeB, rather than using resources on the subframe dedicated to D2D data transmission. In order to allow the eNB to distinguish whether the received scheduling request is for allocating resources for transmitting data over the direct link channel or over the eNB, UE may send along with the scheduling information also identification information associated to the scheduling information.

20 Claims, 14 Drawing Sheets

(56) References Cited

U.S. PATENT DOCUMENTS

| | | | |
|---|---|---|---|
| 8,169,944 | B2 | 5/2012 | Walton et al. |
| 8,184,541 | B2 | 5/2012 | Wang et al. |
| 8,737,380 | B2 | 5/2014 | Tanno et al. |
| 8,761,099 | B2 | 6/2014 | Charbit et al. |
| 9,420,564 | B2 | 8/2016 | Charbit et al. |
| 9,717,016 | B2 | 7/2017 | Zeng et al. |
| 2007/0081484 | A1 | 4/2007 | Wang |
| 2009/0122708 | A1 | 5/2009 | Wang et al. |
| 2009/0220021 | A1 | 9/2009 | Ihm et al. |
| 2010/0243012 | A1 | 9/2010 | Lindeman et al. |
| 2012/0140664 | A1 | 6/2012 | Walton et al. |
| 2013/0142101 | A1 | 6/2013 | Tanno et al. |
| 2014/0010099 | A1 | 1/2014 | Chiu et al. |
| 2014/0126363 | A1 | 5/2014 | Zeng et al. |
| 2015/0055567 | A1 | 2/2015 | Narasimha et al. |
| 2016/0374110 | A1 | 12/2016 | Lee et al. |
| 2017/0019812 | A1 | 1/2017 | Lee et al. |

FOREIGN PATENT DOCUMENTS

| | | |
|---|---|---|
| CN | 103002578 A | 3/2013 |
| CN | 103546970 A | 1/2014 |
| GB | 2499418 A | 8/2013 |
| RU | 2 503 153 C2 | 12/2013 |
| TW | 200713944 A | 4/2007 |
| TW | I311428 B | 6/2009 |
| TW | I343724 B | 6/2011 |
| TW | I370652 B | 8/2012 |
| TW | I378676 B | 12/2012 |
| WO | 2013/010462 A1 | 1/2013 |
| WO | 2013/170175 A2 | 11/2013 |
| WO | 2013/182422 A1 | 12/2013 |
| WO | 2014/014326 A1 | 1/2014 |
| WO | 2014/032222 A1 | 3/2014 |

OTHER PUBLICATIONS

Qualcomm Incorporated, "Background document for 'LTE Device to Device Proximity Services'—Work Item," RP-140056, Agenda Item: 14.1.1, 3GPP TSG RAN Meeting #63, Fukuoka, Japan, Mar. 3-6, 2014, 28 pages.

Patil, "Status Report to TSG," RP-140416, Agenda Item: 13.4.3, 3GPP TSG RAN Meeting #63, Fukuoka, Japan, Mar. 3-6, 2014, 13 pages.

3GPP TR 25.912 V11.0.0, "$3^{rd}$ Generation Partnership Project; Technical Specification Group Radio Access Network; Feasibility study for evolved Universal Terrestrial Radio Access (UTRA) and Universal Terrestrial Radio Access Network (UTRAN) (Release 11)," Sep. 2012, 64 pages.

3GPP TR 25.913 V9.0.0, $3^{rd}$ Generation Partnership Project; Technical Specification Group Radio Access Network; Requirements for Evolved UTRA (E-UTRA) and Evolved UTRAN (E-UTRAN) (Release 9), Dec. 2009, 18 pages.

3GPP TR 36.843 V12.0.0, $3^{rd}$ Generation Partnership Project; Technical Specification Group Radio Access Network; Study on LTE device to device proximity services; Radio aspects (Release 12), Mar. 2014, 49 pages.

3GPP TS 36.101 V12.0.0, "$3^{rd}$ Generation Partnership Project; Technical Specification Radio Access Network; Evolved Universal Terrestrial Radio Access (E-UTRA); User Equipment (UE) radio transmission and reception (Release 12)," Jul. 2013, 450 pages.

3GPP TS 36.211 V8.9.0, "$3^{rd}$ Generation Partnership Project; Technical Specification Group Radio Access Network; Evolved Universal Terrestrial Radio Access (E-UTRA); Physical Channels and Modulation (Release 8)," Dec. 2009, 83 pages.

3GPP TS 36.211 V9.0.0, $3^{rd}$ Generation Partnership Project; Technical Specification Group Radio Access Network; Evolved Universal Terrestrial Radio Access (E-UTRA); Physical Channels and Modulation (Release 9), Dec. 2009, 85 pages.

3GPP TS 36.212 V12.0.0, $3^{rd}$ Generation Partnership Project; Technical Specification Group Radio Access Network; Evolved Universal Terrestrial Radio Access (E-UTRA); Multiplexing and channel coding (Release 12), Dec. 2013, 88 pages.

3GPP TS 36.213 V12.0.0, $3^{rd}$ Generation Partnership Project; Technical Specification Group Radio Access Network; Evolved Universal Terrestrial Radio Access (E-UTRA); Physical layer procedures (Release 12), Dec. 2013, 186 pages.

3GPP TS 36.321 V10.5.0, $3^{rd}$ Generation Partnership Project; Technical Specification Group Radio Access Network; Evolved Universal Terrestrial Radio Access (E-UTRA); Medium Access Control (MAC) protocol specification (Release 10), Mar. 2012, 54 pages.

3GPP TS 36.321 V8.0.0, $3^{rd}$ Generation Partnership Project; Technical Specification Group Radio Access Network; Evolved Universal Terrestrial Radio Access (E-UTRA); Medium Access Control (MAC) protocol specification (Release 8), Dec. 2007, 23 pages.

Chinese Office Action, dated Dec. 29, 2018, for Chinese Application No. 201580013251.6, 18 pages (with machine generated English translation).

Ericsson, "Resource allocation for D2D transmitters in coverage," Tdoc R2-140625, 3GPP TSG-RAN WG2 #85, Agenda Item: 7.5.3, Prague, Czech Republic, Feb. 10-14, 2014, 5 pages.

Extended European Search Report dated Aug. 21, 2014, for corresponding EP Application No. 14001053.9-1857, 6 pages.

International Search Report dated May 15, 2015, for corresponding International Application No. PCT/CN2015/051231, 2 pages.

Nokia, "Buffer Reporting for E-UTRAN," R2-060829, 3GPP TSG-RAN WG2 Meeting #52, Agenda Item: 6.5, Athens, Greece, Mar. 27-31, 2006, 5 pages.

Notice of Reasons for Rejection, dated Sep. 4, 2018, for corresponding Japanese Application No. 2016-556823, 6 pages (With English Translation).

Russian Office Action and Search Report, dated Jul. 19, 2018, for corresponding Russian Application No. 2016136184/08(056830), 12 pages (With English Translations).

Sesia et al., "LTE the UMTS Long Term Evolution—From Theory to Practice," Wiley, 2011, 27 pages.

Taiwanese Office Action and Search Report dated Nov. 9, 2018, for corresponding Taiwanese Application No. 104107246, 5 pages.

Indian Examination Report dated Sep. 8, 2020 for the corresponding Indian Patent Application No. 201647030333, 6 pages.

Korean Office Action, dated Feb. 17, 2021, for Korean Application No. 10-2016-7025141, 11 pages. (with English machine translation).

Phunchongharn et al., "Resource Allocation for Device-to-Device Communications Underlaying LTE-Advanced Networks," *IEEE Wireless Communications* 20(4):91-100, 2013.

SCHEDULING REQUEST PROCEDURE FOR D2D COMMUNICATION

FIELD OF THE INVENTION

The invention relates to a system and method for performing a scheduling request procedure in a device-to-device communication system. The invention is also providing the user equipment for performing the methods described herein.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. The detailed system requirements are given in 3GPP, TR 25.913 ("Requirements for Evolved UTRA and Evolved UTRAN", www.3gpp.org). In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in Rel. 8 LTE.

E-UTRAN Architecture

The overall architecture is shown in FIG. 1 and a more detailed representation of the E-UTRAN architecture is given in FIG. 2. The E-UTRAN consists of one or more eNodeBs, providing the E-UTRA user plane (PDCP/RLC/MAC/PHY) and control plane (RRC) protocol terminations towards the UE. The eNodeB (eNB) hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (UL QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MMEs/Serving Gateways and eNodeBs. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the S-GW terminates the downlink data path and triggers paging when downlink data arrives for the user equipment. It manages and stores user equipment contexts, e.g., parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the S-GW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipment. It checks the authorization of the UE to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipment.

Component Carrier Structure in LTE

The downlink component carrier of a 3GPP LTE system is subdivided in the time-frequency domain in so-called sub-frames. In 3GPP LTE each sub-frame is divided into two downlink slots as shown in FIG. 3, wherein the first downlink slot comprises the control channel region (PDCCH region) within the first OFDM symbols. Each sub-frame consists of a given number of OFDM symbols in the time domain (12 or 14 OFDM symbols in 3GPP LTE (Release 8)), wherein each of OFDM symbol spans over the entire bandwidth of the component carrier. The OFDM symbols thus each consist of a number of modulation symbols transmitted on respective $N_{RB}^{DL} \times N_{sc}^{RB}$ subcarriers as also shown in FIG. 4.

Assuming a multi-carrier communication system, e.g., employing OFDM, as for example used in 3GPP Long Term Evolution (LTE), the smallest unit of resources that can be assigned by the scheduler is one "resource block". A physical resource block is defined as $N_{symb}^{DL}$ consecutive OFDM symbols in the time domain and $N_{sc}^{DL}$ consecutive subcarriers in the frequency domain as exemplified in FIG. 4. In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", version 8.9.0 or 9.0.0, section 6.2, available at http://www.3gpp.org and incorporated herein by reference).

The term "component carrier" refers to a combination of several resource blocks. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Further Advancements for LTE (LTE-A)

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved in the 3GPP. The study item covers technology components to be considered for the evolution of E-UTRA, e.g., to fulfill the requirements on IMT-Advanced. Two major technology components which are currently under consideration for LTE-A are described in the following.

Carrier Aggregation in LTE-A for Support of Wider Bandwidth

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers (CCs) are aggregated in order to support wider transmission bandwidths up to 100 MHz. Several cells in the LTE system are aggregated into one wider channel in the LTE-Advanced system which is wide enough for 100 MHz, even though these cells in LTE are in different frequency bands. A UE may simultaneously receive or transmit on one or multiple CCs depending on its capabilities:

- A Rel-10 UE with reception and/or transmission capabilities for CA can simultaneously receive and/or transmit on multiple CCs corresponding to multiple serving cells;
- A Rel-8/9 UE can receive on a single CC and transmit on a single CC corresponding to one serving cell only.

Carrier aggregation (CA) is supported for both contiguous and non-contiguous CCs with each CC limited to a maximum of 110 Resource Blocks in the frequency domain using the Rel-8/9 numerology.

It is possible to configure a UE to aggregate a different number of CCs originating from the same eNB and of possibly different bandwidths in the UL and the DL.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may not be possible to configure a mobile terminal with more uplink component carriers than downlink component carriers.

In a typical TDD deployment, the number of component carriers and the bandwidth of each component carrier in uplink and downlink is the same. Component carriers originating from the same eNodeB need not to provide the same coverage.

Component carriers shall be LTE Rel-8/9 compatible. Nevertheless, existing mechanisms (e.g., barring) may be used to avoid Rel-8/9 UEs to camp on a component carrier.

The spacing between center frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively. The transport channels are described between MAC and Layer 1, the logical channels are described between MAC and RLC.

When carrier aggregation (CA) is configured, the UE only has one RRC connection with the network. At RRC connection establishment/re-establishment/handover, one serving cell provides the NAS mobility information (e.g., TAI), and at RRC connection re-establishment/handover, one serving cell provides the security input. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC).

Depending on UE capabilities, Secondary Cells (SCells) can be configured to form together with the PCell a set of serving cells. In the downlink, the carrier corresponding to an SCell is a Downlink Secondary Component Carrier (DL SCC), while in the uplink it is an Uplink Secondary Component Carrier (UL SCC).

The configured set of serving cells for a UE therefore always consists of one PCell and one or more SCells:

- For each SCell the usage of uplink resources by the UE in addition to the downlink ones is configurable (the number of DL SCCs configured is therefore always larger or equal to the number of UL SCCs and no SCell can be configured for usage of uplink resources only);
- From a UE viewpoint, each uplink resource only belongs to one serving cell;

The number of serving cells that can be configured depends on the aggregation capability of the UE;

PCell can only be changed with handover procedure (i.e., with security key change and RACH procedure);

PCell is used for transmission of PUCCH;

Unlike SCells, PCell cannot be de-activated;

Re-establishment is triggered when the PCell experiences Rayleigh fading (RLF), not when SCells experience RLF;

Non-access stratum (NAS) information is taken from the downlink PCell.

The configuration and reconfiguration of component carriers can be performed by RRC. Activation and deactivation is done via MAC control elements. At intra-LTE handover, RRC can also add, remove, or reconfigure SCells for usage in the target cell. The reconfiguration, addition and removal of SCells can be performed by RRC. At intra-LTE handover, RRC can also add, remove, or reconfigure SCells for usage with the target PCell. When adding a new SCell, dedicated RRC signaling is used for sending all required system information of the SCell, i.e., while in connected mode, UEs need not acquire broadcasted system information directly from the SCells.

When a user equipment is configured with carrier aggregation there is one pair of uplink and downlink component carriers that is always active. The downlink component carrier of that pair might be also referred to as 'DL anchor carrier'. Same applies also for the uplink.

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking between uplink and downlink component carriers allows identifying the uplink component carrier for which the grant applies when there is no cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

LTE RRC States

The following is mainly describing the two main states in LTE: "RRC_IDLE" and "RRC_CONNECTED".

In RRC_IDLE the radio is not active, but an ID is assigned and tracked by the network. More specifically, a mobile terminal in RRC_IDLE performs cell selection and reselection—in other words, it decides on which cell to camp. The cell (re)selection process takes into account the priority of each applicable frequency of each applicable Radio Access Technology (RAT), the radio link quality and the cell status (i.e., whether a cell is barred or reserved). An RRC_IDLE mobile terminal monitors a paging channel to detect incoming calls, and also acquires system information. The system information mainly consists of parameters by which the network (E-UTRAN) can control the cell (re)selection process. RRC specifies the control signaling applicable for a mobile terminal in RRC_IDLE, namely paging and system information. The mobile terminal behavior in RRC_IDLE is specified in TS 25.912, e.g., Chapter 8.4.2 incorporated herein by reference.

In RRC_CONNECTED the mobile terminal has an active radio operation with contexts in the eNodeB. The E-UTRAN allocates radio resources to the mobile terminal to facilitate the transfer of (unicast) data via shared data channels. To support this operation, the mobile terminal monitors an associated control channel which is used to indicate the dynamic allocation of the shared transmission resources in time and frequency. The mobile terminal provides the network with reports of its buffer status and of the downlink channel quality, as well as neighboring cell measurement information to enable E-UTRAN to select the most appropriate cell for the mobile terminal. These measurement reports include cells using other frequencies or RATs. The UE also receives system information, consisting mainly of information required to use the transmission channels. To extend its battery lifetime, a UE in RRC_CONNECTED may be configured with a Discontinuous Reception (DRX) cycle. RRC is the protocol by which the E-UTRAN controls the UE behavior in RRC_CONNECTED.

Logical and Transport Channels

The MAC layer provides a data transfer service for the RLC layer through logical channels. Logical channels are either Control Logical Channels which carry control data such as RRC signaling, or Traffic Logical Channels which carry user plane data. Broadcast Control Channel (BCCH), Paging Control channel (PCCH), Common Control Channel (CCCH), Multicast Control Channel (MCCH) and Dedicated Control Channel (DCCH) are Control Logical Channels. Dedicated Traffic channel (DTCH) and Multicast Traffic Channel (MTCH) are Traffic Logical Channels.

Data from the MAC layer is exchanged with the physical layer through Transport Channels. Data is multiplexed into transport channels depending on how it is transmitted over the air. Transport channels are classified as downlink or uplink as follows. Broadcast Channel (BCH), Downlink Shared Channel (DL-SCH), Paging Channel (PCH) and Multicast Channel (MCH) are downlink transport channels, whereas the Uplink Shared Channel (UL-SCH) and the Random Access Channel (RACH) are uplink transport channels.

A multiplexing is then performed between logical channels and transport channels in the downlink and uplink respectively.

Layer 1/Layer 2 (L1/L2) Control Signaling

In order to inform the scheduled users about their allocation status, transport format and other data-related information (e.g., HARQ information, transmit power control (TPC) commands), L1/L2 control signaling is transmitted on the downlink along with the data. L1/L2 control signaling is multiplexed with the downlink data in a sub-frame, assuming that the user allocation can change from sub-frame to sub-frame. It should be noted that user allocation might also be performed on a TTI (Transmission Time Interval) basis, where the TTI length is a multiple of the sub-frames. The TTI length may be fixed in a service area for all users, may be different for different users, or may even by dynamic for each user. Generally, the L1/2 control signaling needs only be transmitted once per TTI.

The L1/L2 control signaling is transmitted on the Physical Downlink Control Channel (PDCCH). A PDCCH carries a message as a Downlink Control Information (DCI), which includes resource assignments and other control information for a mobile terminal or groups of UEs. In general, several PDCCHs can be transmitted in one sub-frame.

It should be noted that in 3GPP LTE, assignments for uplink data transmissions, also referred to as uplink scheduling grants or uplink resource assignments, are also transmitted on the PDCCH.

With respect to scheduling grants, the information sent on the L1/L2 control signaling may be separated into the following two categories, Shared Control Information (SCI) carrying Cat 1 information and Downlink Control Information (DCI) carrying Cat 2/3 information.

Shared Control Information (SCI) Carrying Cat 1 Information

The shared control information part of the L1/L2 control signaling contains information related to the resource allocation (indication). The shared control information typically contains the following information:

- A user identity indicating the user(s) that is/are allocated the resources.
- RB allocation information for indicating the resources (Resource Blocks (RBs)) on which a user(s) is/are allocated. The number of allocated resource blocks can be dynamic.
- The duration of assignment (optional), if an assignment over multiple sub-frames (or TTIs) is possible.

Depending on the setup of other channels and the setup of the Downlink Control Information (DCI)—see below—the shared control information may additionally contain information such as ACK/NACK for uplink transmission, uplink scheduling information, information on the DCI (resource, MCS, etc.).

Downlink Control Information (DCI) Carrying Cat 2/3 Information

The downlink control information part of the L1/L2 control signaling contains information related to the transmission format (Cat 2 information) of the data transmitted to a scheduled user indicated by the Cat 1 information. Moreover, in case of using (Hybrid) ARQ as a retransmission protocol, the Cat 2 information carries HARQ (Cat 3) information. The downlink control information needs only to be decoded by the user scheduled according to Cat 1. The downlink control information typically contains information on:

- Cat 2 information: Modulation scheme, transport-block (payload) size or coding rate, MIMO (Multiple Input Multiple Output)-related information, etc. Either the transport-block (or payload size) or the code rate can be signaled. In any case these parameters can be calculated from each other by using the modulation scheme information and the resource information (number of allocated resource blocks);
- Cat 3 information: HARQ related information, e.g., hybrid ARQ process number, redundancy version, retransmission sequence number.

Downlink control information occurs in several formats that differ in overall size and also in the information contained in its fields. The different DCI formats that are currently defined for LTE are as follows and described in detail in 3GPP TS 36.212, "Multiplexing and channel coding", section 5.3.3.1 (available at http://www.3gpp.org and incorporated herein by reference).

Format 0: DCI Format 0 is used for the transmission of resource grants for the PUSCH.

For further information regarding the DCI formats and the particular information that is transmitted in the DCI, please refer to the technical standard or to LTE—The UMTS Long Term Evolution—From Theory to Practice, Edited by Stefania Sesia, Issam Toufik, Matthew Baker, Chapter 9.3, incorporated herein by reference.

Downlink & Uplink Data Transmission

Regarding downlink data transmission, L1/L2 control signaling is transmitted on a separate physical channel (PDCCH), along with the downlink packet data transmission. This L1/L2 control signaling typically contains information on:

- The physical resource(s) on which the data is transmitted (e.g., subcarriers or subcarrier blocks in case of OFDM, codes in case of CDMA). This information allows the mobile terminal (receiver) to identify the resources on which the data is transmitted.
- When user equipment is configured to have a Carrier Indication Field (CIF) in the L1/L2 control signaling, this information identifies the component carrier for which the specific control signaling information is intended. This enables assignments to be sent on one component carrier which are intended for another component carrier ("cross-carrier scheduling"). This other, cross-scheduled component carrier could be for example a PDCCH-less component carrier, i.e., the cross-scheduled component carrier does not carry any L1/L2 control signaling.
- The Transport Format, which is used for the transmission. This can be the transport block size of the data (payload size, information bits size), the MCS (Modulation and Coding Scheme) level, the Spectral Efficiency, the code rate, etc. This information (usually together with the resource allocation (e.g., the number of resource blocks assigned to the user equipment)) allows the user equipment (receiver) to identify the information bit size, the modulation scheme and the code rate in order to start the demodulation, the de-rate-matching and the decoding process. The modulation scheme may be signaled explicitly.
- Hybrid ARQ (HARQ) information:
  - HARQ process number: Allows the user equipment to identify the hybrid ARQ process on which the data is mapped.
  - Sequence number or new data indicator (NDI): Allows the user equipment to identify if the transmission is a new packet or a retransmitted packet. If soft combining is implemented in the HARQ protocol, the sequence number or new data indicator together with the HARQ process number enables soft-combining of the transmissions for a PDU prior to decoding.
  - Redundancy and/or constellation version: Tells the user equipment, which hybrid ARQ redundancy version is used (required for de-rate-matching) and/or which modulation constellation version is used (required for demodulation).
- UE Identity (UE ID): Tells which user equipment the L1/L2 control signaling is intended for. In typical implementations this information is used to mask the CRC of the L1/L2 control signaling in order to prevent other user equipment to read this information.

To enable an uplink packet data transmission, L1/L2 control signaling is transmitted on the downlink (PDCCH) to tell the user equipment about the transmission details. This L1/L2 control signaling typically contains information on:

- The physical resource(s) on which the user equipment should transmit the data (e.g., subcarriers or subcarrier blocks in case of OFDM, codes in case of CDMA).
- When user equipment is configured to have a Carrier Indication Field (CIF) in the L1/L2 control signaling, this information identifies the component carrier for which the specific control signaling information is intended. This enables assignments to be sent on one component carrier which are intended for another component carrier. This other, cross-scheduled component carrier may be for example a PDCCH-less component carrier, i.e., the cross-scheduled component carrier does not carry any L1/L2 control signaling.

L1/L2 control signaling for uplink grants is sent on the DL component carrier that is linked with the uplink component carrier or on one of the several DL component carriers, if several DL component carriers link to the same UL component carrier.

The Transport Format, the user equipment should use for the transmission. This can be the transport block size of the data (payload size, information bits size), the MCS (Modulation and Coding Scheme) level, the Spectral Efficiency, the code rate, etc. This information (usually together with the resource allocation (e.g., the number of resource blocks assigned to the user equipment)) allows the user equipment (transmitter) to pick the information bit size, the modulation scheme and the code rate in order to start the modulation, the rate-matching and the encoding process. In some cases the modulation scheme may be signaled explicitly.

Hybrid ARQ information:
   HARQ Process number: Tells the user equipment from which hybrid ARQ process it should pick the data.
   Sequence number or new data indicator: Tells the user equipment to transmit a new packet or to retransmit a packet. If soft combining is implemented in the HARQ protocol, the sequence number or new data indicator together with the HARQ process number enables soft-combining of the transmissions for a protocol data unit (PDU) prior to decoding.
   Redundancy and/or constellation version: Tells the user equipment which hybrid ARQ redundancy version to use (required for rate-matching) and/or which modulation constellation version to use (required for modulation).

UE Identity (UE ID): Tells which user equipment should transmit data. In typical implementations this information is used to mask the CRC of the L1/L2 control signaling in order to prevent other user equipment to read this information.

There are several different possibilities how to exactly transmit the information pieces mentioned above in uplink and downlink data transmission. Moreover, in uplink and downlink, the L1/L2 control information may also contain additional information or may omit some of the information. For example:

HARQ process number may not be needed, i.e., is not signaled, in case of a synchronous HARQ protocol.
   A redundancy and/or constellation version may not be needed, and thus not signaled, if Chase Combining is used (always the same redundancy and/or constellation version) or if the sequence of redundancy and/or constellation versions is pre-defined.
   Power control information may be additionally included in the control signaling.
   MIMO related control information, such as, e.g., precoding, may be additionally included in the control signaling.
   In case of multi-code word MIMO transmission transport format and/or HARQ information for multiple code words may be included.

For uplink resource assignments (on the Physical Uplink Shared Channel (PUSCH)) signaled on PDCCH in LTE, the L1/L2 control information does not contain a HARQ process number, since a synchronous HARQ protocol is employed for LTE uplink. The HARQ process to be used for an uplink transmission is given by the timing. Furthermore, it should be noted that the redundancy version (RV) information is jointly encoded with the transport format information, i.e., the RV info is embedded in the transport format (TF) field. The Transport Format (TF) respectively modulation and coding scheme (MCS) field has, for example, a size of 5 bits, which corresponds to 32 entries. Three TF/MCS table entries are reserved for indicating redundancy versions (RVs) 1, 2 or 3. The remaining MCS table entries are used to signal the MCS level (TBS) implicitly indicating RV0. The size of the CRC field of the PDCCH is 16 bits.

For downlink assignments (PDSCH) signaled on PDCCH in LTE the Redundancy Version (RV) is signaled separately in a two-bit field. Furthermore, the modulation order information is jointly encoded with the transport format information. Similar to the uplink case there is 5 bit MCS field signaled on PDCCH. Three of the entries are reserved to signal an explicit modulation order, providing no Transport format (Transport block) info. For the remaining 29 entries modulation order and Transport block size info are signaled.

Uplink Access Scheme for LTE

For Uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and assumed improved coverage (higher data rates for a given terminal peak power). During each time interval, Node B assigns users a unique time/frequency resource for transmitting user data thereby ensuring intra-cell orthogonality. An orthogonal access in the uplink promises increased spectral efficiency by eliminating intra-cell interference. Interference due to multipath propagation is handled at the base station (Node B), aided by insertion of a cyclic prefix in the transmitted signal.

The basic physical resource used for data transmission consists of a frequency resource of size $BW_{grant}$ during one time interval, e.g., a sub-frame of 0.5 ms, onto which coded information bits are mapped. It should be noted that a sub-frame, also referred to as transmission time interval (TTI), is the smallest time interval for user data transmission. It is, however, possible to assign a frequency resource $BW_{grant}$ over a longer time period than one TTI to a user by concatenation of sub-frames.

Uplink Scheduling Scheme for LTE

The uplink scheme allows for both scheduled access, i.e., controlled by eNB, and contention-based access.

In case of scheduled access, the UE is allocated a certain frequency resource for a certain time (i.e., a time/frequency resource) for uplink data transmission. However, some time/frequency resources can be allocated for contention-based access; within these time/frequency resources, UEs can transmit without first being scheduled. One scenario where UE is making a contention-based access is, for example, the random access, i.e., when UE is performing initial access to a cell or for requesting uplink resources.

For the scheduled access the Node B scheduler assigns a user a unique frequency/time resource for uplink data transmission. More specifically the scheduler determines
   which UE(s) that is (are) allowed to transmit,
   which physical channel resources (frequency), Transport format (Modulation Coding Scheme (MCS)) to be used by the mobile terminal for transmission The allocation information is signaled to the UE via a scheduling grant, sent on the L1/L2 control channel. For simplicity reasons this channel may be called uplink grant channel in the following. A scheduling grant message contains at least information which part of the frequency band the UE is allowed to use, the validity period of the grant and the transport format the UE has to use for the upcoming uplink transmission. The shortest validity period is one sub-frame. Additional information may also be included in the grant message, depending on the selected scheme. Only "per UE" grants are used to grant the right to transmit on the UL-SCH (i.e., there are no "per UE per RB" grants). Therefore, the UE needs to distribute the allocated resources among the radio bearers according to some rules. Unlike in HSUPA there is no UE-based transport format selection. The eNB decides the transport format based on some information, e.g., reported scheduling information and QoS info, and UE has to follow the selected transport format. In HSUPA the Node B assigns the maximum uplink resource, and the UE selects accordingly the actual transport format for the data transmissions.

Since the scheduling of radio resources is the most important function in a shared channel access network for determining Quality of service, there are a number of requirements that should be fulfilled by the UL scheduling scheme for LTE in order to allow for an efficient QoS management.

Starvation of low priority services should be avoided;
Clear QoS differentiation for radio bearers/services should be supported by the scheduling scheme;
The UL reporting should allow fine granular buffer status reports (e.g., per radio bearer or per radio bearer group) in order to allow the eNB scheduler to identify for which Radio Bearer/service data is to be sent;
It should be possible to make clear QoS differentiation between services of different users;
It should be possible to provide a minimum bit rate per radio bearer.

As can be seen from the above list, one essential aspect of the LTE scheduling scheme is to provide mechanisms with which the operator can control the partitioning of its aggregated cell capacity between the radio bearers of the different QoS classes. The QoS class of a radio bearer is identified by the QoS profile of the corresponding SAE bearer signaled from AGW to eNB as described before. An operator can then allocate a certain amount of its aggregated cell capacity to the aggregated traffic associated with radio bearers of a certain QoS class. The main goal of employing this class-based approach is to be able to differentiate the treatment of packets depending on the QoS class they belong to.

Buffer Status Reporting/Scheduling Request Procedure for Uplink Scheduling

The usual mode of scheduling is dynamic scheduling, by means of downlink assignment messages for the allocation of downlink transmission resources and uplink grant messages for the allocation of uplink transmission resources; these are usually valid for specific single sub-frames. They are transmitted on the PDCCH using C-RNTI of the UE as already mentioned before. Dynamic scheduling is efficient for services types, in which the traffic is bursty and dynamic in rate, such as TCP.

In addition to the dynamic scheduling, a persistent scheduling is defined, which enables radio resources to be semi-statically configured and allocated to a UE for a longer time period than one sub-frame, thus avoiding the need for specific downlink assignment messages or uplink grant messages over the PDCCH for each sub-frame. Persistent scheduling is useful for services such as VoIP for which the data packets are small, periodic and semi-static in size. Thus, the overhead of the PDCCH is significantly reduced compared to the case of dynamic scheduling.

Buffer status reports (BSR) from the UE to the eNodeB are used to assist the eNodeB in allocating uplink resources, i.e., uplink scheduling. For the downlink case, the eNB scheduler is obviously aware of the amount of data to be delivered to each UE; however, for the uplink direction, since scheduling decisions are done at the eNB and the buffer for the data is in the UE, BSRs have to be sent from the UE to the eNB in order to indicate the amount of data that needs to be transmitted over the UL-SCH.

There are basically two types of Buffer Status Report MAC control elements (BSR) defined for LTE: a long BSR (with four buffer size fields corresponding to LCG IDs #0-3) or a short BSR (with one LCG ID field and one corresponding buffer size field). The buffer size field indicates the total amount of data available across all logical channels of a logical channel group, and is indicated in number of bytes encoded as an index of different buffer size levels (see also 3GPP TS 36.321 v 10.5.0 Chapter 6.1.3.1, incorporated herewith by reference). In addition, there is a further type of Buffer Status Report, for use of truncated data, where the Buffer Status Report is 2 bytes long.

Which one of either the short or the long BSR is transmitted by the UE depends on the available transmission resources in a transport block, on how many groups of logical channels have non-empty buffers and on whether a specific event is triggered at the UE. The long BSR reports the amount of data for four logical channel groups, whereas the short BSR indicates the amount of data buffered for only the highest logical channel group.

The reason for introducing the logical channel group concept is that even though the UE may have more than four logical channels configured, reporting the buffer status for each individual logical channel would cause too much signaling overhead. Therefore, the eNB assigns each logical channel to a logical channel group; preferably, logical channels with same/similar QoS requirements should be allocated within the same logical channel group.

A BSR may be triggered, as an example, for the following events:
Whenever data arrives for a logical channel, which has a higher priority than the logical channels whose buffer are non-empty;
Whenever data becomes available for any logical channel, when there was previously no data available for transmission;
Whenever the retransmission BSR time expires;
Whenever periodic BSR reporting is due, i.e., periodic BSR timer expires;
Whenever there is a spare space in a transport block which can accommodate a BSR.

In order to be robust against transmission failures, there is a BSR retransmission mechanism defined for LTE; the retransmission BSR timer is started or restarted whenever an uplink grant is restarted. If no uplink grant is received before the retransmission BSR timer expires, another BSR is triggered by the UE.

If the UE has no uplink resources allocated for including a BSR in the transport block (TB) when a BSR is triggered the UE sends a scheduling request (SR) on the Physical Uplink Control Channel (PUCCH), if configured. For the case that there are no D-SR (dedicated Scheduling request)

resources on PUCCH configured, the UE will start the Random Access Procedure (RACH procedure) in order to request UL-SCH resources for transmission the BSR info to eNB. However, it should be noted that the UE will not trigger SR transmission for the case that a periodic BSR is to be transmitted.

Furthermore an enhancement to the SR transmission has been introduced for a specific scheduling mode where resources are persistently allocated with a defined periodicity in order to save L1/2 control signaling overhead for transmission grants, which is referred to as semi-persistent scheduling (SPS). One example for a service, which has been mainly considered for semi-persistent scheduling is VoIP. Every 20 ms a VoIP packet is generated at the Codec during a talk-spurt. Therefore eNB can allocate uplink or respectively downlink resource persistently every 20 ms, which could be then used for the transmission of VoIP packets. In general SPS is beneficial for services with predictable traffic behavior, i.e., constant bit rate, packet arrival time is periodic. For the case that SPS is configured for the uplink direction, the eNB can turn off SR triggering/transmission for certain configured logical channels, i.e., BSR triggering due to data arrival on those specific configured logical channels will not trigger an SR. The motivation for such kind of enhancements is reporting an SR for those logical channels which will use the semi-persistently allocated resources (logical channels which carry VoIP packets) is of no value for eNB scheduling and hence should be avoided.

More detailed information with regard to BSR and in particular the triggering of same is explained in 3GPP TS 36.321 V10.5 in Chapter 5.4.5 incorporated herewith by reference.

Logical Channel Prioritization

The UE has an uplink rate control function which manages the sharing of uplink resources between radio bearers. This uplink rate control function is also referred to as logical channel prioritization procedure in the following. The Logical Channel Prioritization (LCP) procedure is applied when a new transmission is performed, i.e., a Transport block needs to be generated. One proposal for assigning capacity has been to assign resources to each bearer, in priority order, until each has received an allocation equivalent to the minimum data rate for that bearer, after which any additional capacity is assigned to bearers in, for example, priority order.

As will become evident from the description of the LCP procedure given below, the implementation of the LCP procedure residing in the UE is based on the token bucket model, which is well known in the IP world. The basic functionality of this model is as follows. Periodically at a given rate a token, which represents the right to transmit a quantity of data, is added to the bucket. When the UE is granted resources, it is allowed to transmit data up to the amount represented by the number of tokens in the bucket. When transmitting data the UE removes the number of tokens equivalent to the quantity of transmitted data. In case the bucket is full, any further tokens are discarded. For the addition of tokens it could be assumed that the period of the repetition of this process would be every TTI, but it could be easily lengthened such that a token is only added every second. Basically instead of every 1 ms a token is added to the bucket, 1000 tokens could be added every second. In the following the logical channel prioritization procedure which is used in Rel-8 is described.

More detailed information with regard to the LCP procedure is explained in 3GPP TS 36.321 V8 in Chapter 5.4.3.1, incorporated herewith by reference.

RRC controls the scheduling of uplink data by signaling for each logical channel: priority where an increasing priority value indicates a lower priority level, prioritisedBitRate which sets the Prioritized Bit Rate (PBR), bucketSizeDuration which sets the Bucket Size Duration (BSD). The idea behind prioritized bit rate is to support for each bearer, including low priority non-GBR bearers, a minimum bit rate in order to avoid a potential starvation. Each bearer should at least get enough resources in order to achieve the prioritized bit rate (PRB).

The UE shall maintain a variable Bj for each logical channel j. Bj shall be initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The UE shall perform the following Logical Channel Prioritization procedure when a new transmission is performed:

The UE shall allocate resources to the logical channels in the following steps:

Step 1: All the logical channels with Bj>0 are allocated resources in a decreasing priority order. If the PBR of a radio bearer is set to "infinity", the UE shall allocate resources for all the data that is available for transmission on the radio bearer before meeting the PBR of the lower priority radio bearer(s);

Step 2: the UE shall decrement Bj by the total size of MAC SDUs served to logical channel j in Step 1 It has to be noted at this point that the value of Bj can be negative.

Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

The UE shall also follow the rules below during the scheduling procedures above:

the UE should not segment an RLC SDU (or partially transmitted SDU or retransmitted RLC PDU) if the whole SDU (or partially transmitted SDU or retransmitted RLC PDU) fits into the remaining resources;

if the UE segments an RLC SDU from the logical channel, it shall maximize the size of the segment to fill the grant as much as possible;

UE should maximize the transmission of data.

For the Logical Channel Prioritization procedure, the UE shall take into account the following relative priority in decreasing order:

MAC control element for C-RNTI or data from UL-CCCH;

MAC control element for BSR, with exception of BSR included for padding;

MAC control element for PHR;

data from any Logical Channel, except data from UL-CCCH;

MAC control element for BSR included for padding.

For the case of carrier aggregation, which is described in a later section, when the UE is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when UE is requested to transmit multiple MAC PDUs in one TTI.

Uplink Power Control

Uplink transmission power control in a mobile communication system serves an important purpose: it balances the need for sufficient transmitted energy per bit to achieve the required Quality-of-Service (QoS), against the needs to minimize interference to other users of the system and to maximize the battery life of the mobile terminal. In achieving this purpose, the role of the Power Control (PC) becomes decisive to provide the required SINR while controlling at the same time the interference caused to neighboring cells. The idea of classic PC schemes in uplink is that all users are received with the same SINR, which is known as full compensation. As an alternative, 3GPP has adopted for LTE the use of Fractional Power Control (FPC). This new functionality makes users with a higher path-loss operate at a lower SINR requirement so that they will more likely generate less interference to neighboring cells.

Detailed power control formulae are specified in LTE for the Physical Uplink Shared Channel (PUSCH), Physical Uplink Control Channel (PUCCH) and the Sounding Reference Signals (SRSs) (section 5.1 in TS36.213). The formula for each of these uplink signals follows the same basic principles; in all cases they can be considered as a summation of two main terms: a basic open-loop operating point derived from static or semi-static parameters signaled by the eNodeB, and a dynamic offset updated from sub-frame to sub-frame.

The basic open-loop operating point for the transmit power per resource block depends on a number of factors including the inter-cell interference and cell load. It can be further broken down into two components, a semi-static base level P0, further comprised of a common power level for all UEs in the cell (measured in dBm) and a UE-specific offset, and an open-loop path-loss compensation component. The dynamic offset part of the power per resource block can also be further broken down into two components, a component dependent on the used MCS and explicit Transmitter Power Control (TPC) commands.

The MCS-dependent component (referred to in the LTE specifications as $\Delta TF$, where TF stands for 'Transport Format') allows the transmitted power per RB to be adapted according to the transmitted information data rate.

The other component of the dynamic offset is the UE-specific TPC commands. These can operate in two different modes: accumulative TPC commands (available for PUSCH, PUCCH and SRS) and absolute TPC commands (available for PUSCH only). For the PUSCH, the switch between these two modes is configured semi-statically for each UE by RRC signaling—i.e., the mode cannot be changed dynamically. With the accumulative TPC commands, each TPC command signals a power step relative to the previous level.

Power Headroom Reporting

In order to assist the eNodeB to schedule the uplink transmission resources to different UEs in an appropriate way, it is important that the UE can report its available power headroom to eNodeB.

The eNodeB can use the power headroom reports to determine how much more uplink bandwidth per sub-frame a UE is capable of using. This helps to avoid allocating uplink transmission resources to UEs which are unable to use them in order to avoid a waste of resources.

The range of the power headroom report is from +40 to −23 dB. The negative part of the range enables the UE to signal to the eNodeB the extent to which it has received an UL grant which would require more transmission power than the UE has available. This would enable the eNodeB to reduce the size of a subsequent grant, thus freeing up transmission resources to allocate to other UEs.

A power headroom report can only be sent in sub-frames in which a UE has an UL grant. The report relates to the sub-frame in which it is sent. A number of criteria are defined to trigger a power headroom report. These include:

A significant change in estimated path loss since the last power headroom report More than a configured time has elapsed since the previous power headroom report More than a configured number of closed-loop TPC commands have been implemented by the UE The eNodeB can configure parameters to control each of these triggers depending on the system loading and the requirements of its scheduling algorithm. To be more specific, RRC controls power headroom reporting by configuring the two timers periodicPHR-Timer and prohibitPHR-Timer, and by signaling dl-PathlossChange which sets the change in measured downlink pathloss to trigger a power headroom report.

The power headroom report is send as a MAC Control Element. It consists of a single octet where the two highest bits are reserved and the six lowest bits represent the dB values mentioned above in 1 dB steps. The structure of the MAC Control Element is shown in FIG. 7.

The UE power headroom PH valid for sub-frame i is defined by:

$$PH(i) = P_{CMAX} - \{10 \ \log_{10}(M_{PUSCH}(i)) + P_{O\_PUSCH}(j) + \alpha(j) \cdot PL | \Delta_{TF}(i) + f(i)\} \ [dB]$$

The power headroom shall be rounded to the closest value in the range [40; −23] dB with steps of 1 dB.

$P_{cmax}$, the maximum UE Transmission power (Tx power) is a value chosen by the UE in the given range of $P_{CMAX\_L}$ and $P_{CMAX\_H}$.

$$P_{CMAX\_L} \leq P_{CMAX} \leq P_{CMAX\_H}, \text{ where}$$

$$P_{CMAX\_L} = \text{MIN}\{P_{EMAX} - \Delta T_C, P_{PowerClass} - \text{MPR} - \text{A-MPR} - \Delta T_c\}, \text{ and}$$

$$P_{CMAX\_H} = \text{MIN}\{P_{EMAX}, P_{PowerClass}\};$$

And where $P_{EMAX}$ is the value signaled by the network.

MPR is a power reduction value used to control the adjacent channel leakage power ratio (ACLR) associated with the various modulation schemes and the transmission bandwidth.

A-MPR is the additional maximum power reduction. It is band specific and it is applied when configured by the network. Therefore, Pcmax is UE implementation specific and hence not known by eNB.

More detailed information with regard to $\Delta T_C$ is specified in 3GPP TS TS36.101, Vers. 12.0.0, section 6.2.5, incorporated herein by reference.

LTE Device-to-Device (D2D) Proximity Services

Proximity-based applications and services represent an emerging social-technological trend. The identified areas include services related to commercial services and Public Safety that would be of interest to operators and users. The introduction of a Proximity Services (ProSe) capability in LTE would allow the 3GPP industry to serve this developing market, and will, at the same time, serve the urgent needs of several Public Safety communities that are jointly committed to LTE.

Device-to-Device (D2D) communication is a technology component for LTE-rel.12. The Device-to-Device (D2D) communication technology allows D2D as an underlay to the cellular network to increase the spectral efficiency. For example, if the cellular network is LTE, all data carrying physical channels use SC-FDMA for D2D signaling. In D2D communication, user equipment (UEs) transmit data signals to each other over a direct link using the cellular resources instead of through the Base Station. A possible scenario in a D2D compatible communication system is shown in FIG. 9.

D2D Communication in LTE

The "D2D communication in LTE" is focusing on two areas; Discovery and Communication whereas this invention is mostly related to the communication part. Therefore in the following the technical background is focusing on the communication part.

Device-to-Device (D2D) communication is a technology component for LTE-A. In D2D communication, UEs transmit data signals to each other over a direct link instead of through the BS. D2D users communicate directly while remaining controlled under the BS, i.e., at least when being in coverage of an eNB. Therefore D2D can improve system performances by reusing cellular resources.

It is assumed that D2D operates in uplink LTE spectrum (in the case of FDD) or uplink sub-frames of the cell giving coverage (in case of TDD except when out of coverage). Furthermore D2D transmission/reception does not use full duplex on a given carrier. From individual UE perspective, on a given carrier D2D signal reception and LTE uplink transmission do not use full duplex, i.e., no simultaneous D2D signal reception and LTE UL transmission is possible.

In D2D communication when UE1 has a role of transmission (transmitting user equipment), UE1 sends data and UE2 (receiving user equipment) receives it. UE1 and UE2 can change their transmission and reception role. The transmission from UE1 can be received by one or more UEs like UE2.

With respect to the User plane protocols, in the following the content of the agreement [3GPP TS 36.843vers. 12.0.0 section 9.2] from D2D communication perspective is reported:

PDCP:
  1: M D2D broadcast communication data (i.e., IP packets) should be handled as the normal user-plane data.
  Header-compression/decompression in PDCP is applicable for 1: M D2D broadcast communication.
  U-Mode is used for header compression in PDCP for D2D broadcast operation for public safety;

RLC:
  RLC UM is used for 1: M D2D broadcast communication.
  Segmentation and Re-assembly is supported on L2 by RLC UM.
  A receiving UE needs to maintain at least one RLC UM entity per transmitting peer UE.
  An RLC UM receiver entity does not need to be configured prior to reception of the first RLC UM data unit.
  So far no need has been identified for RLC AM or RLC TM for D2D communication for user plane data transmission.

MAC:
  No HARQ feedback is assumed for 1: M D2D broadcast communication
  The receiving UE needs to know a source ID in order to identify the receiver RLC UM entity.
  The MAC header comprises a L2 target ID which allows filtering out packets at MAC layer.
  The L2 target ID may be a broadcast, group cast or unicast address.
    L2 Groupcast/Unicast: A L2 target ID carried in the MAC header would allow discarding a received RLC UM PDU even before delivering it to the RLC receiver entity.
    L2 Broadcast: A receiving UE would process all received RLC PDUs from all transmitters and aim to re-assemble and deliver IP packets to upper layers.
  MAC sub header contains LCIDs (to differentiate multiple logical channels).
  At least Multiplexing/de-multiplexing, priority handling and padding are useful for D2D.

Resource Allocation

The resource allocation for D2D communication is under discussion and is described in its present form in 3GPP TS 36.843, version 12.0.0, section 9.2.3, incorporated herein by reference.

From the perspective of a transmitting UE, a UE can operate in two modes for resource allocation:
  Mode 1: eNodeB or Release-10 relay node schedules the exact resources used by a UE to transmit direct data and direct control information
  Mode 2: a UE on its own selects resources from resource pools to transmit direct data and direct control information D2D communication capable UE shall support at least Mode 1 for in-coverage. D2D communication capable UE shall support Mode 2 for at least edge-of-coverage and/or out-of-coverage UEs in-coverage and out-of-coverage need to be aware of a resource pool (time/frequency) for D2D communication reception.

All UEs (Mode 1 ("scheduled") and Mode 2 ("autonomous")) are provided with a resource pool (time and frequency) in which they attempt to receive scheduling assignments.

In Mode 1, a UE requests transmission resources from an eNodeB. The eNodeB schedules transmission resources for transmission of scheduling assignment(s) and data.

The UE sends a scheduling request (D-SR or RA) to the eNodeB followed by a BSR based on which the eNodeB can determine that the UE intends to perform a D2D transmission as well as the required amount resources.

In Mode 1, the UE needs to be RRC Connected in order to transmit D2D communication.

For Mode 2, UEs are provided with a resource pool (time and frequency) from which they choose resources for transmitting D2D communication.

FIG. 8 schematically illustrates the Overlay (LTE) and the Underlay (D2D) transmission and/or reception resources. The eNodeB controls whether the UE may apply Mode 1 or Mode 2 transmission. Once the UE knows its resources where it can transmit (or receive) D2D communication, it uses the corresponding resources only for the corresponding transmission/reception. In the example of FIG. 8, the D2D sub-frames will only be used to receive or transmit the D2D signals. Since the UE as a D2D device would operate in Half Duplex mode, it can either receive or transmit the D2D signals at any point of time. Similarly, in the same figure, the other sub-frames can be used for LTE (overlay) transmissions and/or reception.

D2D discovery is the procedure/process of identifying other D2D capable and interested devices in the vicinity. For this purpose, the D2D devices that want to be discovered would send some discovery signals (on certain network resources) and the receiving UE interested in the said discovery signal will come to know of such transmitting D2D devices. Ch. 8 of 3GPP TS 36.843 describes the available details of D2D Discovery mechanisms. Following two types of discovery procedure are defined:

Type 1: a discovery procedure where resources for discovery signal transmission are allocated on a non UE specific basis Type 2: a discovery procedure where resources for discovery signal transmission are allocated on a per UE specific basis:

Type 2A: Resources are allocated for each specific transmission instance of discovery signals;

Type 2B: Resources are semi-persistently allocated for discovery signal transmission.

Current discussions on scheduling schemes for allocating D2D resources focus on how to incorporate the D2D related SR/BSR signaling into the LTE-A system, i.e., whether LTE BSR/SR mechanism and resources, e.g., D-SR on PUCCH or PRACH resources, are reused for D2D communication purpose. According to a scheme being actually considered, the eNodeB configures dedicated or contention-based resources within the D2D sub-frame or region for performing the scheduling procedure. In other words, a scheduling request (SR) and or a Buffer Status Report (BSR) related to D2D transmissions are sent to the eNodeB on dedicated resources on a sub-frame dedicated for D2D transmissions. Thus, the user equipment shall only use resources within D2D sub-frame/region for all the D2D related transmissions, including messages for performing the scheduling procedure, i.e., the SR and or BSR.

This approach has the disadvantage that the radio resource management can get very complex when eNodeB has to support resources, such as PUCCH resources for a dedicated Scheduling Request (D-SR) and RACH resources (contention-based SR) within the D2D sub-frame or region.

As a consequence, these resources need to be also signaled to all D2D-enabled UEs and cannot be used for D2D data discovery transmission, thereby leading to a loss of performance in data transmission. Further, other modification to the LTE standard (RAN 4) will be required if new PUCCH resources are to be configured within D2D sub-frames.

Finally, the eNodeB would be required to monitor and or receive D2D resources in order receive D-SR/PRACH/BSR from D2D UE. This solution would therefore lead to an overloading of the eNodeB.

SUMMARY OF THE INVENTION

In order to integrate D2D communication into the LTE system some aspects of the LTE systems, such as the procedures, the spectrum for the data communication and the like are taken over. As an Example, in uplink communication, the uplink spectrum of the LTE system is used also for device-to-device communications.

The object of the invention is developing a method and system capable of integrating device-to-device (D2D) communication into the LTE system in a manner so as to need as few changes as possible to the current system. More specifically, the present invention aims at developing a system and a method that incorporates the scheduling request and the Buffest Status Support (BSR) procedure for device-to-device communications in an LTE system.

The object is solved by the subject matter of the independent claims. Advantageous embodiments are subject to the dependent claims.

According to a first aspect of the present invention, a D2D capable transmitting user equipment, which needs to transmit data to a receiving user equipment over a direct link data channel, uses the services of the eNodeB in order to have resources allocated for transmitting said data. To this end the UE sends to the eNB scheduling information using resources of a sub-frame dedicated for standard uplink communication through the eNodeB, rather than using resources on the sub-frame dedicated to D2D data transmission. In order to allow the eNB to distinguish whether the received scheduling request is for allocating resources for transmitting data over the direct link channel or over the eNB, UE may send along with the scheduling information also identification information associated to the scheduling information.

Advantageously, the user equipment may send a buffer status report to the eNodeB on the uplink data channel, for example the PUSCH, and on a frame used for LTE data transfer and scheduling messaging.

According to a further aspect of the invention, in the case that no resources are available to the UE for sending the scheduling information, before sending the scheduling information, the UE may send to the eNB a scheduling request for requesting allocation of resources for the uplink data channel for sending the scheduling information to the eNB. The transmission of the scheduling request may be triggered by two events. The first triggering condition includes the presence of data to be transmitted in the transmission buffer of the transmitting user equipment. The second triggering condition foresees that the data in the transmission buffer change by a predefined amount from the transmission of the last scheduling information. Advantageously, the data in the transmission buffer may increase by a predefined amount with respect to the data amount in the transmission buffer at the time the last scheduling information was triggered or sent. According to a further advantageous implementation, the second triggering condition may in alternative be verified, if the data in the transmission buffer exceed a predefined threshold.

According to the first aspect described above, a transmitting user equipment is provided, which is adapted to transmit data to a receiving user equipment over a direct link connection in a communication system. The transmitting user equipment is further adapted to request resources in the communication system and comprises a transmitting unit configured to transmit to a base station direct link scheduling information for allocation of resources for transmitting data to the receiving user equipment over the direct link connection. The direct link scheduling information is transmitted to the base station on an uplink data channel for transmitting data to the base station.

According to a further aspect of the invention described above, a communication method is provided for requesting resources by a transmitting user equipment in a communication system, wherein data is to be transmitted from the transmitting user equipment to a receiving user equipment over a direct link. The method comprises the steps of transmitting, at the transmitting user equipment, to a base station direct link scheduling information for allocation of resources for transmitting data to the receiving user equipment over the direct link connection. The direct link scheduling information may be transmitted to the base station on an uplink data channel for transmitting data to the base station.

BRIEF DESCRIPTION OF THE DRAWINGS

In the following the invention is described in more detail in reference to the attached figures and drawings. Similar or corresponding details in the figures are marked with the same reference numerals.

DETAILED DESCRIPTION

Figure 1:
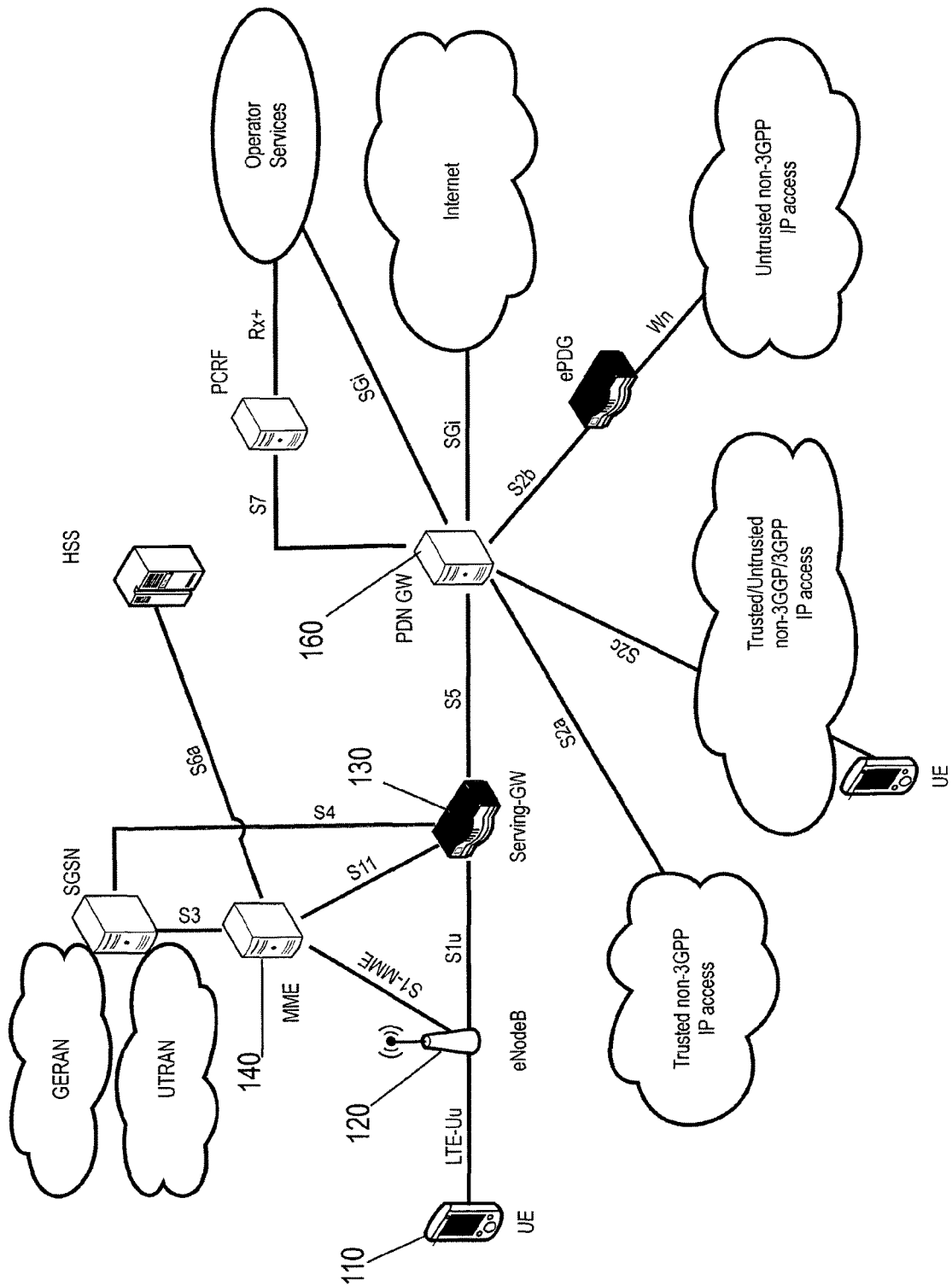
FIG. 1 shows an exemplary architecture of a 3GPP LTE system.
Figure 2:
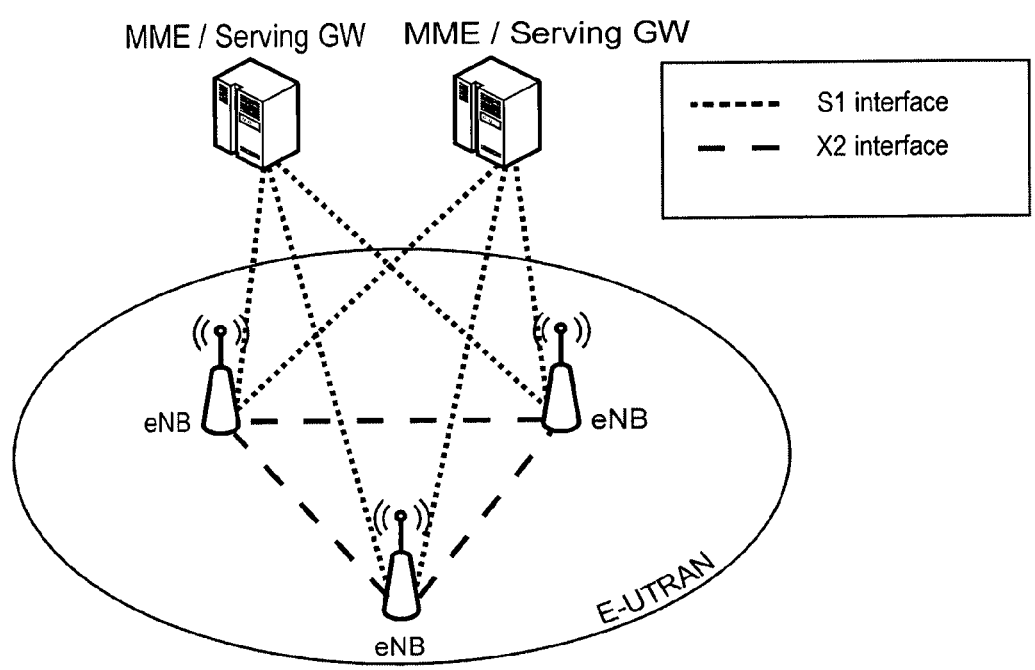
FIG. 2 shows an exemplary overview of the overall E-UTRAN architecture of 3GPP LTE.
Figure 3:
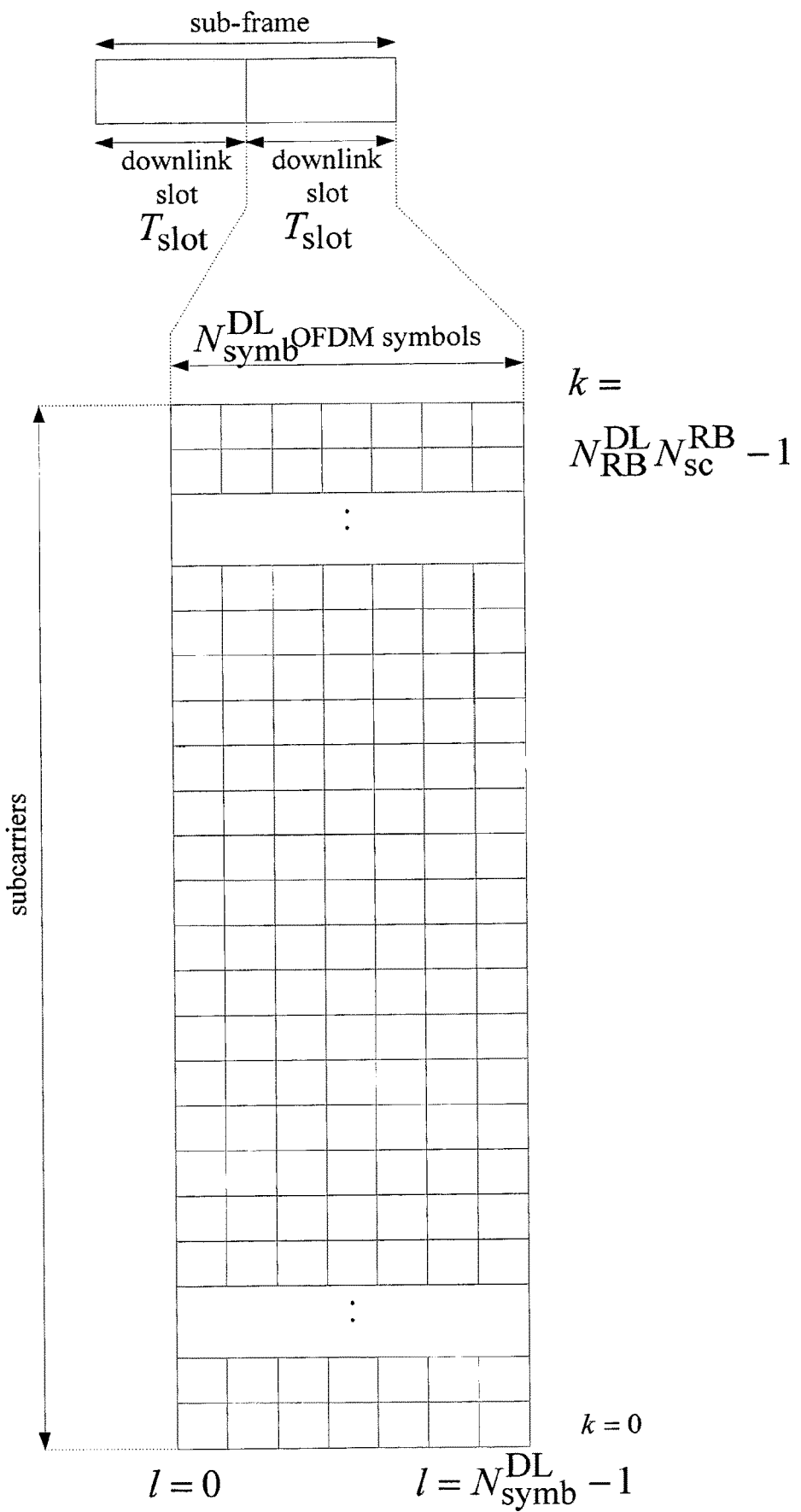
FIG. 3 shows exemplary sub-frame boundaries on a downlink component carrier as defined for 3GPP LTE (Release 8/9)
Figure 4:
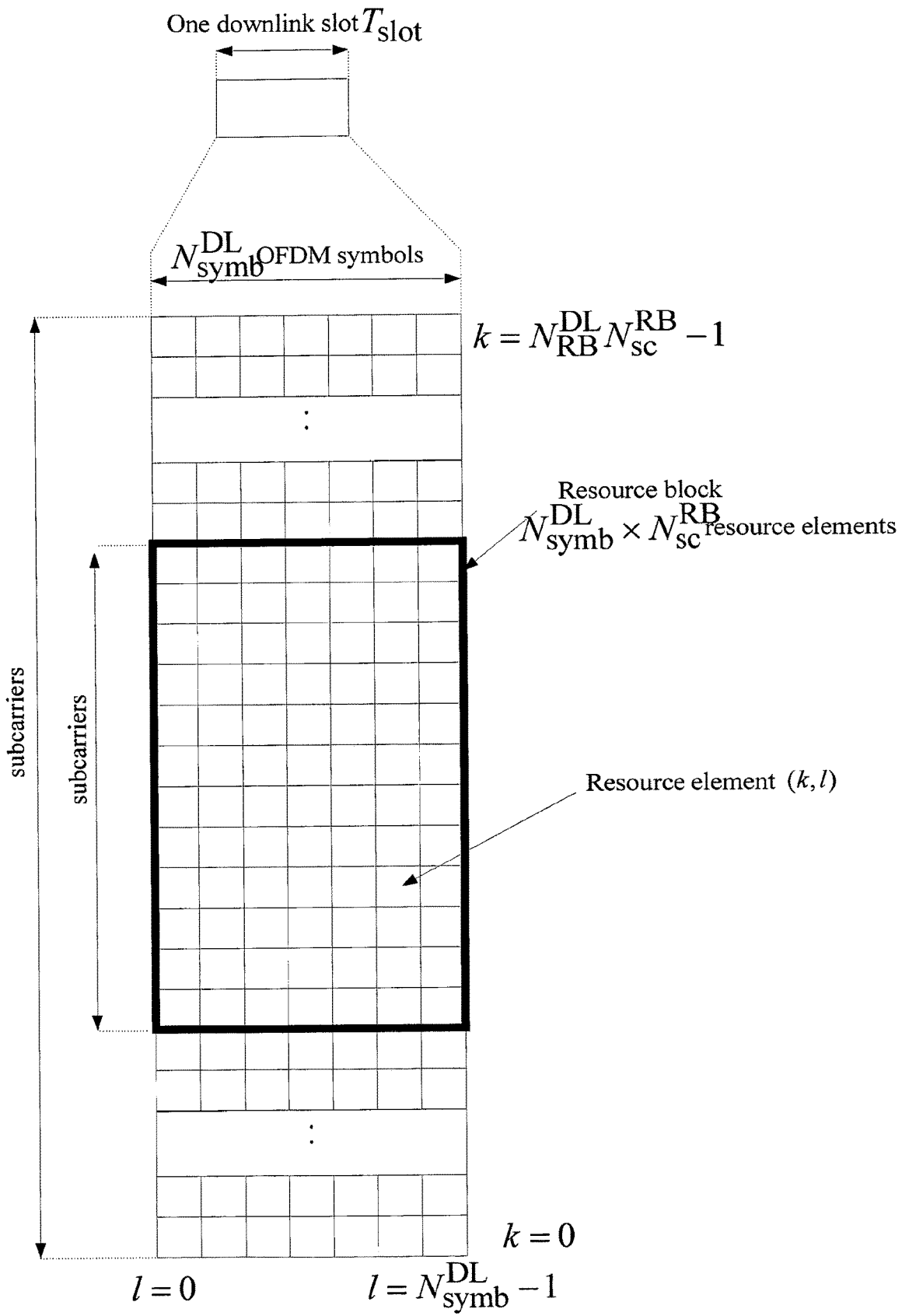
FIG. 4 shows an exemplary downlink resource grid of a downlink slot as defined for 3GPP LTE (Release 8/9)
Figure 5:
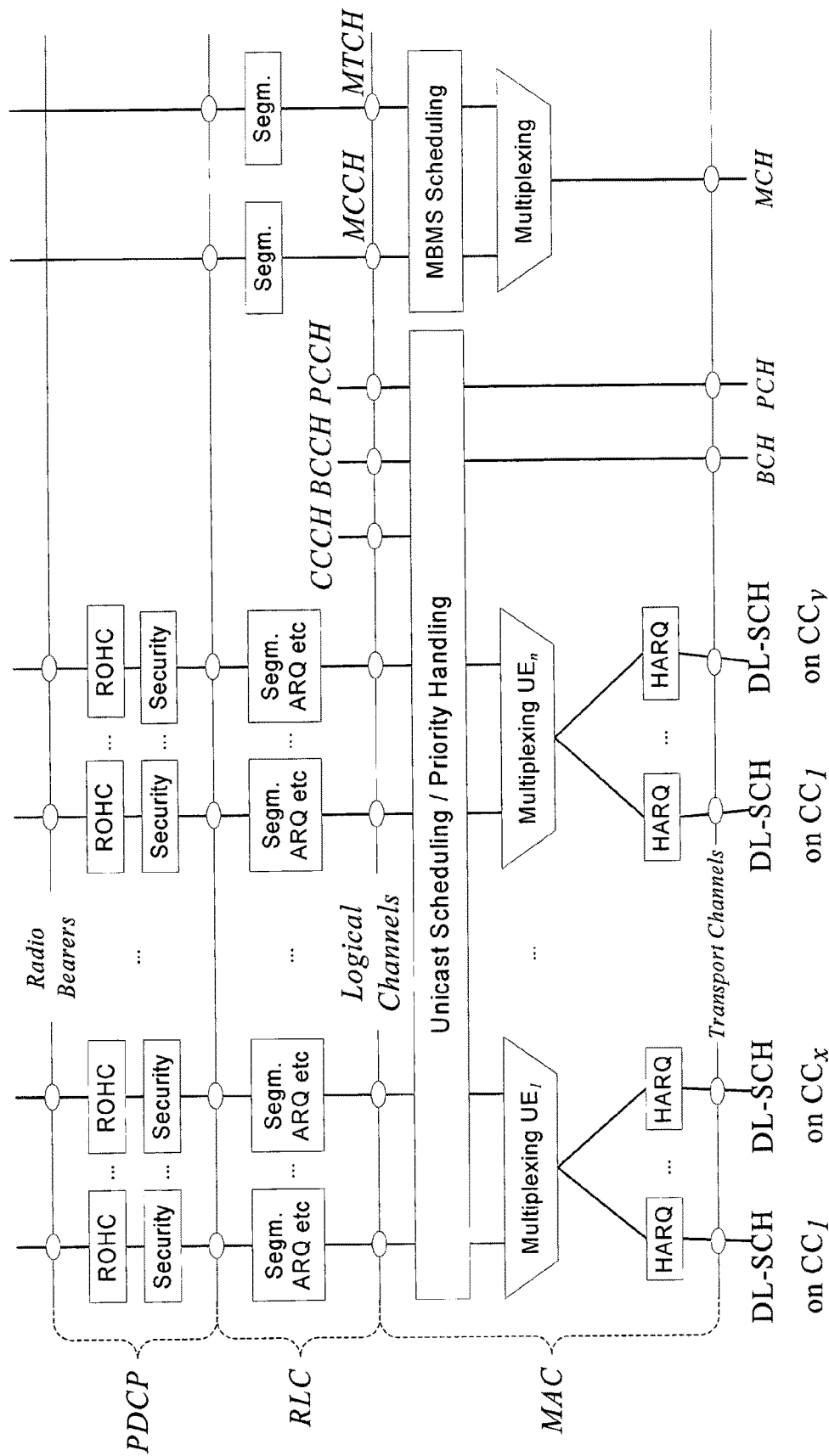
FIGS. 5 and 6 show the 3GPP LTE-A (Release 10) Layer 2 structure with activated carrier aggregation for the downlink and uplink, respectively.
Figure 6:
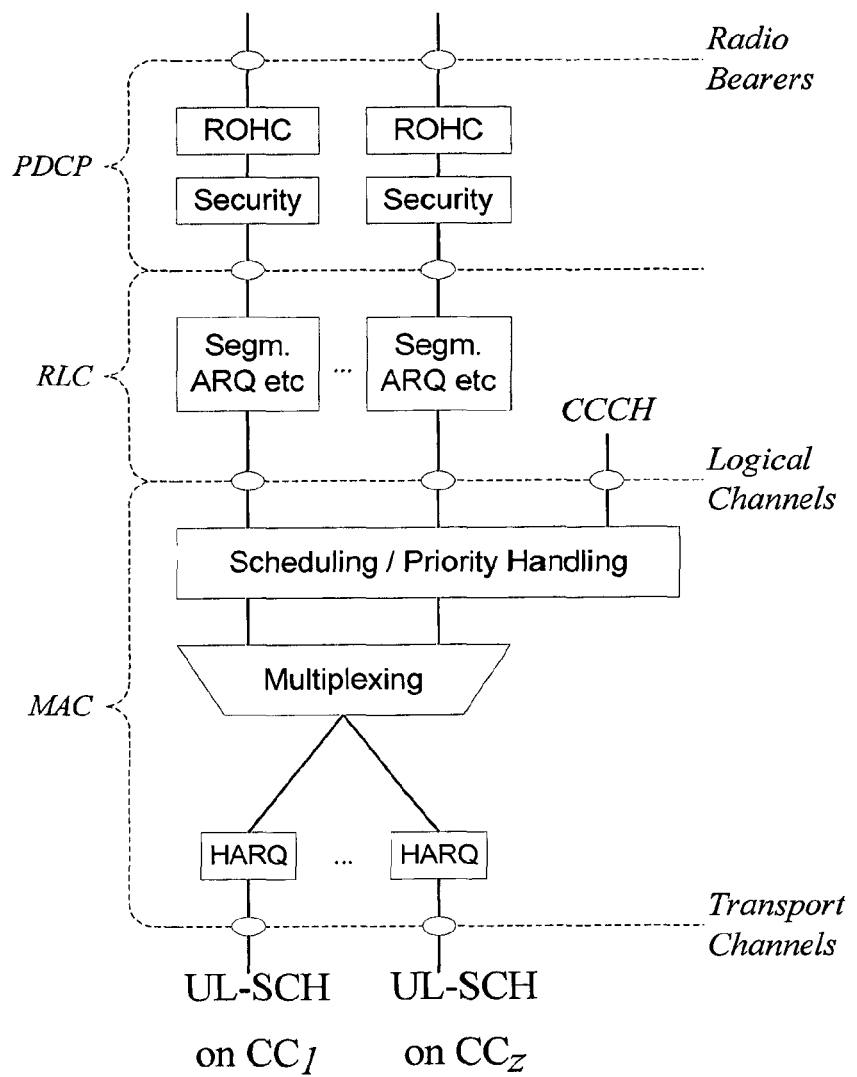
Figures 7, 8:
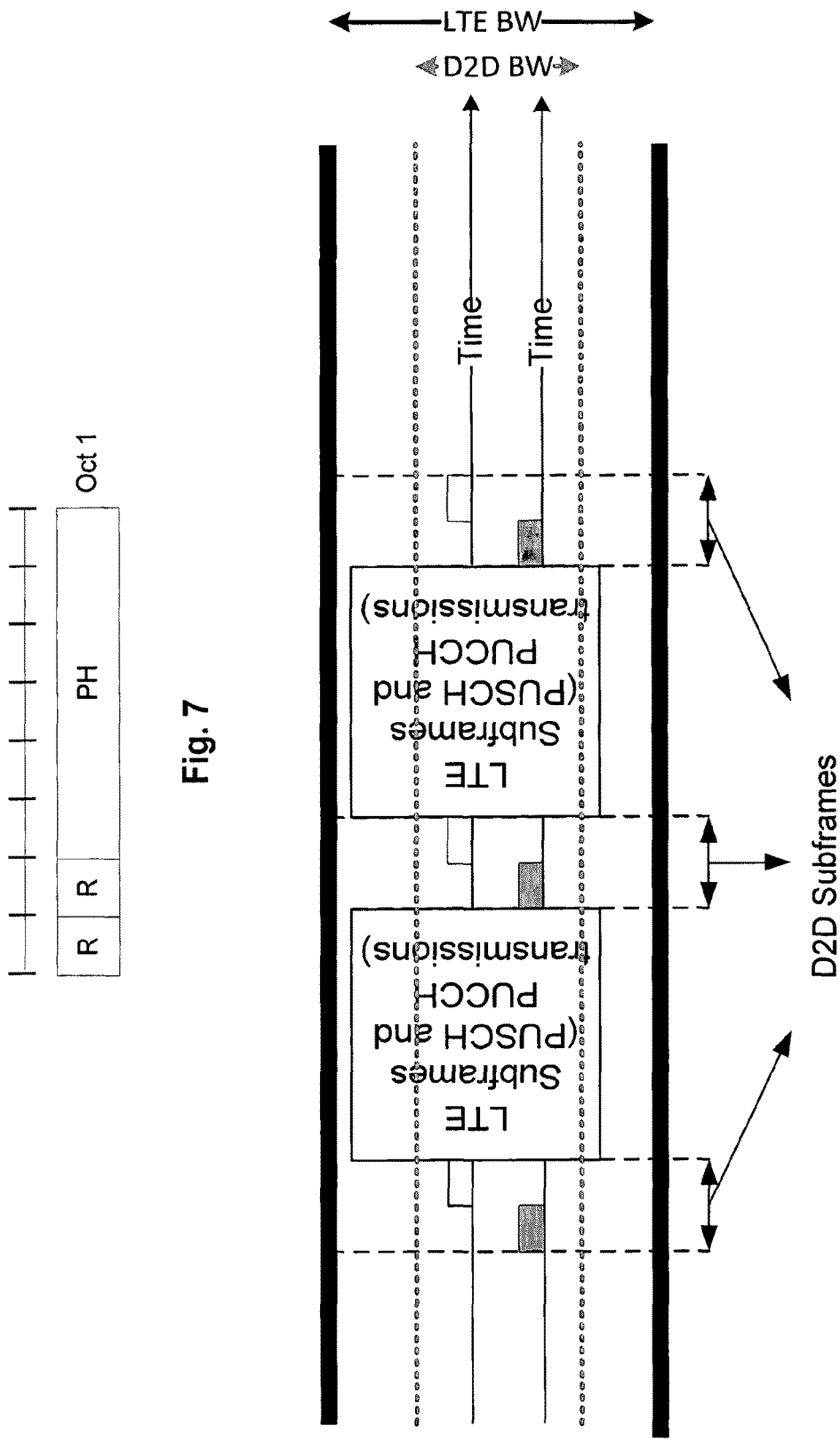
FIG. 7 shows the structure of a MAC Control Element.
FIG. 8 is a schematic illustration showing the overlay (LTE) and the Underlay (D2D) transmission and reception resources in D2D sub-frames.
Figure 9:
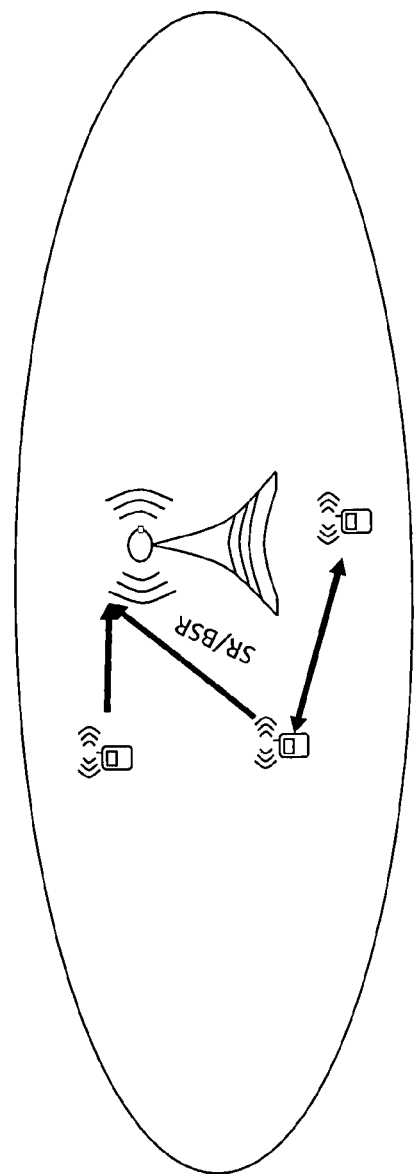
FIG. 9 is a schematic illustration showing a system including D2D capable user equipment.

The following paragraphs will describe various embodiments of the invention. For exemplary purposes only, most of the embodiments are outlined in relation to a radio access scheme according to 3GPP LTE (Release 8/9) and LTE-A (Release 10/11/12) mobile communication systems, partly discussed in the Technical Background section above. It should be noted that the invention may be advantageously used for example in a mobile communication system such as 3GPP LTE-A (Release 10/11/12) communication systems as described in the Technical Background section above, but the invention is not limited to its use in this particular exemplary communication networks.

The term "direct link" used in the claims and in the description is to be understood as a communication link (communication channel) between two D2D user equipment, which allows the exchange of data directly without the involvement of the network. In other words, a communication channel is established between two user equipment in the communication system, which are close enough for directly exchanging data, bypassing the eNodeB (base station). This term is used in contrast with "LTE link" or "LTE (uplink) traffic", which instead refers to data traffic between user equipment managed by the eNodeB.

The term "transmitting user equipment" used in the claims and in the description is to be understood as a mobile device capable of transmitting and receiving data. The adjective transmitting is only meant to clarify a temporary operation. The term is used in contrast to "receiving user equipment", which refers to a mobile device temporarily performing the operation of receiving data.

The term "new data" used in the claims and in the description is to be understood as data that arrives/is stored in the transmission buffer which was previously not there. This data (data packets) is received from a higher layer, e.g., IP layer, and placed into the transmission buffer. This term is used in contrast to "old data", referring to data which is kept in the transmission buffer as long as the transmission protocol makes sure that this data is correctly received at the receiving side.

The term "arrival" used in the claims and in the description with regard to data and transmission buffers shall be understood as that data, which is to be transmitted by the user equipment "enters", or "is put into", or "is temporarily stored in" the transmission buffer of the corresponding logical channel for transmission.

In the following, several embodiments of the invention will be explained in detail. The explanations should not be understood as limiting the invention, but as a mere example of the invention's embodiments to better understand the invention. A skilled person should be aware that the general principles of the invention as laid out in the claims can be applied to different scenarios and in ways that are not explicitly described herein. Correspondingly, the following scenario assumed for explanatory purposes of the various embodiments shall not limit the invention as such.

The present invention is mainly directed to the scheduling procedure for device-to-device (D2D) communication in LTE systems. A D2D capable user equipment can operate in two modes for the allocation of resources. According to a first operation mode (mode 1), the eNodeB schedules the exact resources which is used by the transmitting user equipment to transmit data to a receiving user equipment over a direct link channel. Specifically, the transmitting user equipment sends a request for allocation of resources to the eNodeB and, based on the request for allocation, the latter schedules the exact resources needed by the transmitting user equipment to transmit data directly to the receiving user equipment (scheduled operation mode).

The second operation mode (mode 2), is a collision-based approach. According to this approach, each user equipment has been provided a set of D2D time/frequency resources used for D2D communication, which is also referred to as resource pool. The transmitting user equipment can autonomously select, from the resource pool, the resources for transmitting data and control information directly to the receiving user equipment(s) over the direct link communication channel (autonomous operation mode).

In the scheduled operation mode (mode 1), scheduling information is transmitted to the eNodeB on an uplink data channel. The scheduling information may be a Buffer Status Report in a MAC BSR Control Element, which is sent to the eNodeB on a Physical Uplink Shared Control Channel (PUSCH).

A first embodiment of the invention will be explained in connection with FIG. 10, which illustrates the messages exchanged between the transmitting user equipment (UE1) and the base station (eNB) for scheduling purposes and the data exchange between the transmitting user equipment (UE1) and a receiving user equipment (UE2). The transmitting user equipment (UE1) requests resources by transmitting buffer status information to the eNodeB over the LTE uplink data channel (PUSCH) and transmits data to the receiving user equipment over a direct link communication channel. Even though the buffer status information is related to D2D data transmission, i.e., data of D2D bearers which is sent over the direct link (also referred to as PC5 interface), transmission of the buffer status information is transmitted in an LTE uplink time/frequency resource not in a D2D sub-frame respectively time/frequency resource. Specifically, once the eNB receives the BSR, it will allocate resources from the time/frequency resources which are reserved for D2D data communication, e.g., direct link channel, for allowing the transmitting user equipment (UE1) to transmit data to the receiving user equipment (UE2). It should be noted that the resource allocation for D2D data communication respectively the grant which allocates the D2D transmission resources might be different compared to an LTE uplink grant. For example the D2D resource could be allocated for a longer timeframe, not just for one TTI. In general it is expected that D2D resource allocations grant is using a new downlink control format (DCI). The DCI may be also scrambled with a new R-NTI, i.e., a D2D RNTI in contrast to the C-RNTI which is used for LTE uplink grants. If the granted resources are not enough to transmit all the data to the receiving user equipment (UE2), the eNB will successively grant resources over the direct link channel until the data has been completely transmitted by the transmitting user equipment (UE1) to the receiving user equipment (UE2). In other words, once allocation of resources has been granted to the transmitting user equipment, the transmitting user equipment (UE1) and the receiving user equipment (UE2) can communicate with each other without the involvement of, i.e., bypassing, the network: there is a direct communication channel between the two mobile stations. Data are thus not first sent to the eNodeB using uplink resources, for instance on PUSCH, and then sent by the back eNodeB via the LTE core network to the user equipment.

Figure 10:
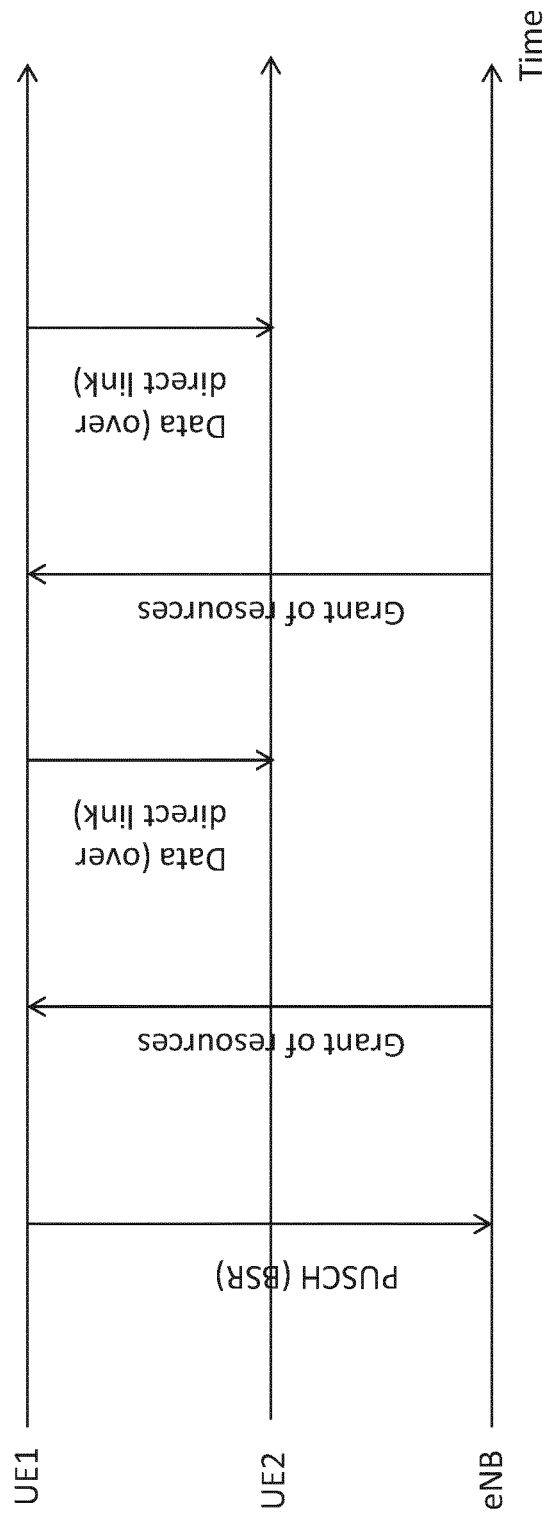
FIG. 10 is a schematic drawing illustrating the messages exchanged between the transmitting user equipment (UE1) and the base station (eNB) for scheduling purposes and the data exchange between the transmitting user equipment (UE1) and a receiving user equipment (UE2), according to a first realization of the present invention.

As can be seen in the diagram depicted in FIG. 10, the scheduling request procedure can be seen as regular LTE traffic, in which the transmitting user equipment (UE1) contacts the eNodeB in order to ask allocation of resources for transmitting data stored in a data buffer or transmission on the user equipment (not shown), i.e., data stored for the D2D bearers. Afterwards, once the eNodeB has assigned D2D time/frequency resources for transmitting data, the user equipment start data transmission on the D2D resources, i.e., also referred to as direct link data channel. From this point on time communication between the transmitting user equipment (UE1) and the receiving user equipment (UE2) will occur without mediation from, i.e., bypassing, the eNodeB.

Alternatively or in addition, a scheduling request may be either transmitted via resources of the PUCCH allocated by the eNB, i.e., also referred to as dedicated scheduling request (D-SR), or by using a RACH procedure. If not indicated differently, in the following we will assume that such resources of the PUCCH, which are typically allocated periodically by the eNB, are available to the UE for transmitting the scheduling request as soon as it is triggered; nevertheless, the invention is also applicable when using a RACH procedure instead. A dedicated scheduling request is usually one bit long, and corresponding periodic PUCCH resources allow transmitting the scheduling request but are not sufficient for transmitting further data such as the buffer status report or actual data of the transmission buffer. As described in the technical background section in LTE a scheduling request is triggered for the case that a buffer status report has been triggered but there are no PUSCH resources available for the transmission of the buffer status report. In other words the purpose of the scheduling request is to ask eNB for the allocation of PUSCH resources so that UE could transmit the buffer status report which in turn enables the eNB to allocate adequate resources for the transmission of the uplink data.

According to one embodiment of the invention, the D2D enabled transmitting UE transmits a scheduling request (SR) either on the PUCCH (D-SR) or performs the RACH procedure (contention based scheduling request) when there is a buffer status report triggered for D2D bearers, e.g., when new data arrives for a D2D bearer. This scheduling request is transmitted in a regular LTE uplink time/frequency resource, i.e., not on a time/frequency resource reserved for D2D. Upon receiving this scheduling request the eNB will allocate PUSCH resources to the D2D transmitting UE. The D2D transmitting UE will transmit in turn the D2D related buffer status information within this PUSCH resources as described already above. Based on the detailed buffer status information, eNB will allocate D2D time/frequency resources for the D2D data communication. For the allocation of the PUSCH resources upon reception of the scheduling request the regular LTE uplink grant/DCI procedure, i.e., uplink grant is addressed to the C-RNTI, PDCCH/PUSCH timing relation, is used.

As mentioned above the second uplink grant/resource allocation, i.e., upon having received the D2D related buffer status information, may use a different resource allocation format/DCI, e.g., addressed to a D2D RNTI.

A more detailed description of the triggering of the scheduling request will be given in the following with reference to FIG. 12.

The D2D capable user equipment (not shown) is adapted to send data on both the LTE uplink data channels and on the direct communication data channel reserved for D2D communications. To this end some sub-frames respectively time/frequency resources will be reserved for the LTE uplink traffic, while other sub-frames respectively time/frequency resources are reserved for D2D transmission, i.e., this could be D2D discovery signaling and/or D2D data communication. Preferably, a predefined time slot will be allocated to each sub-frame in an alternating manner following a TDM scheme. As an example, longer time periods can be allocated to the signals that require more resources, by reserving more consecutive time slots for the one of the two kinds of sub-frames mentioned above, while reducing the time period allocated to the signals requiring less resources.

Figure 11:
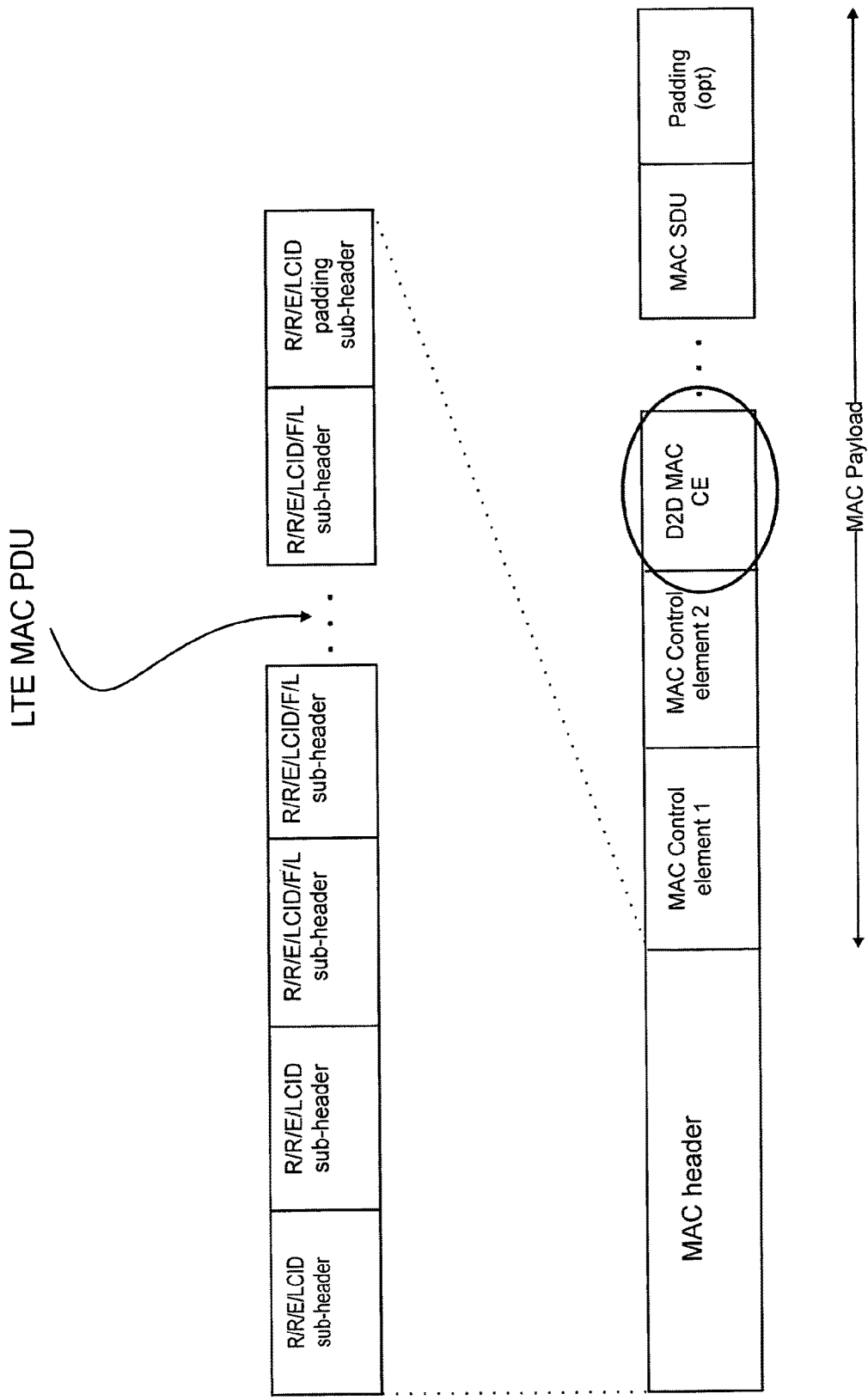
FIG. 11 illustrates a composition of a MAC Protocol Data Unit (PDU) according to an implementation of the scheduling method and system according to the invention.

FIG. 11 describes a composition of a MAC Protocol Data Unit (PDU) according to an implementation of the scheduling method and system described with reference to FIG. 10. The MAC Protocol Data Unit referred to in the buffer status reporting procedure according to the scheduling method described in relation with FIG. 10 incorporates a control element for performing D2D related signaling. Preferably, the scheduling information for D2D communication may be a D2D dedicated Buffer Status Report, which may be implemented by a MAC control element for D2D communication. Accordingly, the MAC Protocol Data Unit transmitted on the PUSCH may include, besides the MAC control elements, such as MAC BSR/PHR CEs (indicated in FIG. 11 as MAC CE1 and MAC CE2), used for performing scheduling in uplink LTE traffic, also one or more D2D MAC control element, which will be used for performing scheduling of the resources for transmitting data from the transmitting user equipment to the receiving user equipment on the direct link channel.

The D2D MAC control element in the MAC PDU may be further associated to an identification number. Said identification number may be, for example, a reserved logical channel ID, which may be stored in the header of the MAC PDU, i.e., MAC sub-header. Advantageously, the identification number may be stored in the R/R/E/LCID sub-header corresponding to the D2D MAC CE. Accordingly, the eNodeB will be able to distinguish which buffer status report in the MAC PDU has to be used for scheduling procedures of D2D data transmission on the direct link connection or for scheduling LTE cellular uplink traffic. This logical channel ID is according to one embodiment of the invention one of the reserved logical channel IDs (LCIDs) specified in TS36.321 Table 6.2.1-2, incorporated herewith by reference.

The D2D communication method described with reference to FIG. 10 may further include a new enhanced logical channel prioritization (LCP) procedure for LTE uplink transmissions on PUSCH. An LCP procedure is commonly responsible for allocating data to be transmitted on different channels into one MAC PDU. Each D2D-capable user equipment may include a multiplexing unit in the MAC layer (not shown) for multiplexing data of different logical channels and MAC control elements into said one MAC PDU. The MAC control elements will carry for example scheduling related information used for performing scheduling of both LTE uplink traffic and D2D direct communication.

The LCP procedure defines a relative priority order, according to which the user equipment can build the MAC PDU. Advantageously, the LPC procedure for LTE uplink transmission may define the position or order of the data parts that compose the MAC PDU. As an explicative example only, the case could be considered, in which 100 bytes are available for the MAC PDU and the data to be multiplexed into the MAC PDU consists of 200 bytes. Based on the LCP procedure, the user equipment will be able to decide which of the 200 bytes can be transmitted within the MAC PDU and in which order. The remaining 100 bytes of data will then be transmitted in the predefined order in the next MAC PDU, based on the priorities defined in the LCP procedure. A skilled person will clearly understand that the above example is for illustrative purposes only and the invention should not be limited to a realization, where 100 bytes are available for the MAC PDU. On the contrary, according to the invention, more than 100 bytes or less than 100 bytes may be available to MAC PDU. The number of bytes available for the MAC PDU is a design option that will be set from case to case depending on the hardware characteristics of the devices, such as the user equipment.

According to an advantageous arrangement, the MAC PDU transmitted on the PUSCH may be organized according to the following priorities in descending order defined in the LCP procedure:

MAC control element for C-RNTI or data from UL-CCCH;
MAC control element for D2D BSR;
MAC control element for BSR, with exception of BSR included for padding;
MAC control element for PHR or Extended PHR;
data from any Logical Channel, except data from UL-CCCH;
MAC control element for BSR included for padding.

According to the priority order defined by the LCP procedure described above, the D2D buffer status report has a higher priority with respect to the buffer status report used for performing a scheduling procedure for LTE cellular uplink traffic.

Clearly, the above order is merely an example for explicative purposes. According to a further advantageous arrangement, more importance could be given to the LTE traffic by assigning a higher priority to the buffer status report corresponding to LTE uplink traffic. Accordingly, the LCP procedure for D2D-capable UE may define the following priorities in descending order:

MAC control element for C-RNTI or data from UL-CCCH;
MAC control element for BSR, with exception of BSR included for padding;
MAC control element for D2D BSR;
MAC control element for PHR or Extended PHR;
data from any Logical Channel, except data from UL-CCCH;
MAC control element for BSR included for padding.

Again, the examples of LCP procedures reported above are only two of several possible options for the definition of relative priorities and do not have to be considered as limiting the invention. Other priority orders can be clearly defined according to the network configuration and communication specifications.

A common Buffer Status Reports in LTE systems can be 1 or 4 bytes long (respectively short and long BSR). In addition a truncated BSR of 2 bytes can be also used as described in the introductory portion, section "Buffer Status reporting/Scheduling Request procedure for uplink scheduling".

In a D2D communication scenario, communication set up is not managed/configured by the eNodeB but rather by a separate entity, e.g., such as a D2D server in the core network or respectively a D2D Management entity in the UE. The D2D Management entity which could be also referred to as ProSe Management Entity (PME) resides in the UE and is provisioned with configuration parameters, e.g., protocol/bearer configuration, used during D2D communication. The provisioning is performed by pre-configuration or, in case of network coverage, by signaling between the PME and the D2D Function/server in the core network. To support D2D communication over "D2D Bearer", the PME then configures Layer 2 and the physical layer based on the in beforehand provisioned configuration parameters. Since the eNodeB is not aware of the detailed configuration parameters for data transfer over the D2D direct link connection, such as which D2D bearers the user equipment use for data transfer, no quality of service (QoS) control from the network point of view as ensured for LTE traffic is provisioned for D2D data communication. Since the detailed D2D bearer configurations maybe not known to eNB the D2D Buffer Status Report may advantageously include only the amount of data which is in the buffer for all D2D bearers. This would be in contrast to an BSR for LTE traffic/bearers which is organized on logical channel group level.

In addition to information on the amount of data of D2D bearers stored in the transmission buffer, the D2D BRS MAC CE may further advantageously include some further information which allows for more efficiently scheduling of D2D data communication by eNB. As an example the D2D buffer status report may according to another embodiment of the invention include an indication of the D2D traffic or bearer type for which D2D time/frequency resources should be allocated by eNB. Advantageously, the D2D BSR MAC CE may include one or more type-flags indicating the traffic or bearer type. As an example, a type-flag may include information on whether the data to be transmitted on the D2D direct link channel is speech data, or another non-conversional type of data, such as video data.

Based on the type flag, which carries information on the traffic bearer type, the eNodeB can schedule resources more efficiently. As an example, from the type-flag the eNodeB may derive that the transmitted data are speech data, such as VOIP data. Accordingly the eNodeB may allocate the resources' priority, in the usual manner as done for speech data transmission on LTE uplink data channel. Specifically, the eNodeB can allocate resources for transmitting a certain amount of bits periodically. As an example, for a speech signal, which is a periodic signal, the eNodeB may allocate resources for transmitting over the D2D direct link data channel resources every 20 ms.

In contrast thereto, if the type-flag indicates that the data to be transferred over the D2D direct link data channel is a non-conversation service, such as video data, the eNodeB may allocate, based on the type-flag information in the BSR, the resources not periodically but rather as a one-time allocation.

In conclusion, for LTE communication, the traffic is controlled by the network, and, therefore, the eNodeB has information about, for instance, which QoS the different bearers need to support. However, the eNodeB cannot retrieve this information for D2D data traffic, since the latter occurs without the mediation of the network. Consequently, together with the buffer status report the user equipment has to provide this information to the eNodeB for D2D communications. To this end the type-flag information in the BSR may advantageously provide the eNodeB with information about the bearers and the data traffic on the D2D direct link channel, which are otherwise not directly obtainable by the eNodeB. This information could be then also used by the eNB in order to prioritize D2D resource allocation among several D2D transmitting UEs. As an example when eNB receives multiple scheduling requests respectively D2D related buffer status information the eNB needs to prioritize the resource allocations. This could be for example done according to some further alternative embodiment based on some priority info included in the D2D buffer status MAC CE. The priority info may be for example retrieved from the PME which configures Layer 2 and the physical layer based on the in beforehand provisioned configuration parameters as outlined above. As an example for each D2D bearer the PME could associate a priority value similar to the logical channel priority for LTE bearers. When a D2D transmitting UE intends to transmit D2D data, it may for example include the priority value of the highest priority D2D bearer for which the UE requests transmission resources.

A user equipment is provided with transmission buffer memory for the data of each logical channel, used for temporarily storing uplink data until it is successfully transmitted over the radio link to the eNodeB. Furthermore, the UE has no uplink resources available to transmit the data or a buffer status report to the base station, making it thus necessary to transmit a scheduling request to the eNB, which process shall be improved by the first embodiment of the invention.

In the configuration explained in connection with FIG. 10, the transmitting user equipment sends a D2D related buffer status report to the eNB when data of D2D bearers to be transmitted over the D2D direct link data channel is temporarily stored in the transmission buffer of the transmitting user equipment.

In addition, the triggering of the D2D buffer status report may be immediately followed by the triggering of a scheduling request, provided no uplink shared channel resources (UL-SCH) are available to transmit the triggered buffer status report.

As explained before, scheduling requests may be either transmitted via resources of the PUCCH allocated by the eNodeB or by using a RACH procedure. If not indicated differently, in the following we will assume that such resources of the PUCCH, which are typically allocated periodically by the eNodeB, are available to the UE for transmitting the scheduling request as soon as it is triggered; nevertheless, the invention is also applicable when using a RACH procedure instead. A scheduling request is usually one bit long, and corresponding periodic PUCCH resources allow transmitting the scheduling request but are not sufficient for transmitting further data such as the buffer status report or actual data of the transmission buffer. Furthermore based on the scheduling request the eNB is not aware of whether the UE requests transmission resources for a direct link transmission (D2D data transmission) or for a LTE uplink transmission. Only based on the buffer status report as outlined above the eNB can distinguish a request for D2D transmission and a LTE uplink transmission.

Figure 12:
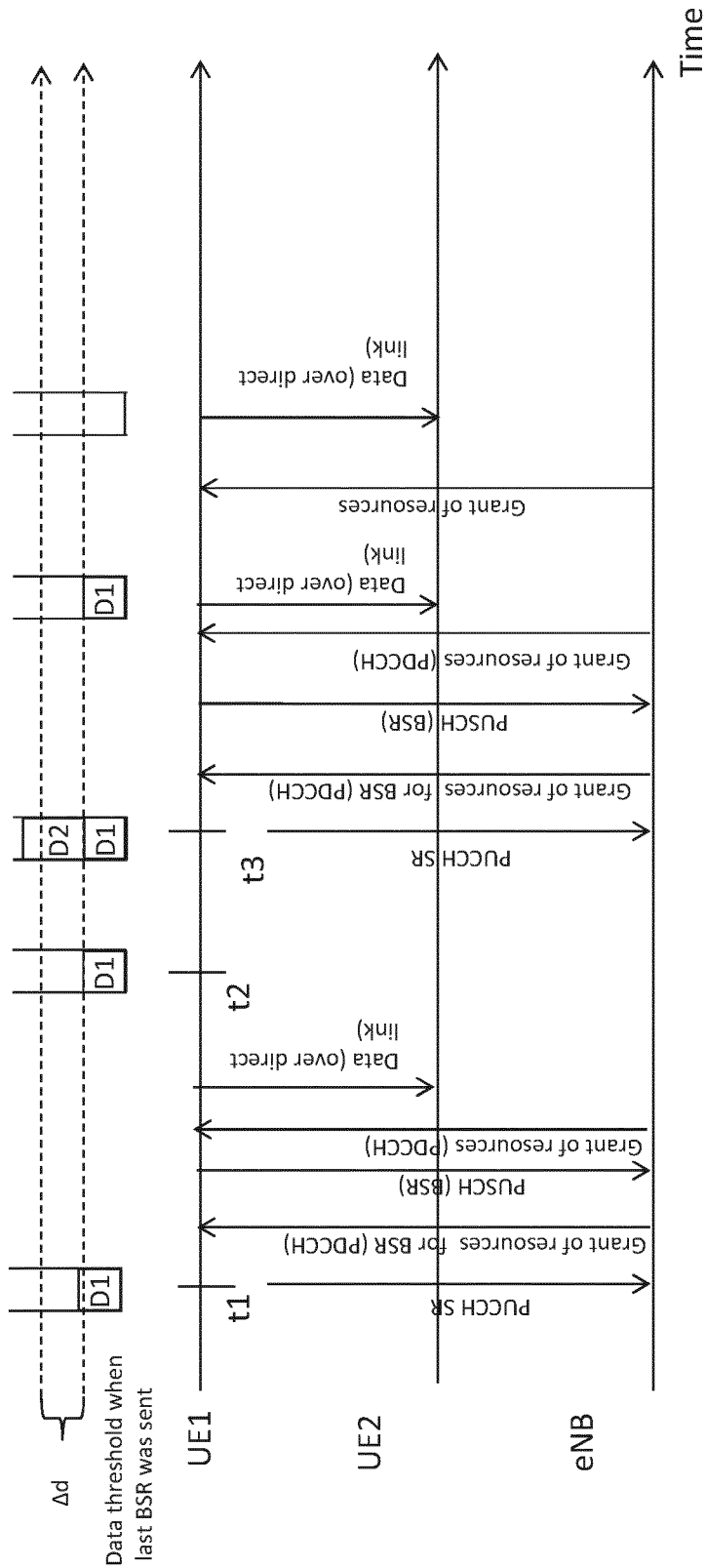
FIG. 12 is a schematic drawing illustrating the messages exchanged between the transmitting user equipment (UE1) and the base station (eNB) for scheduling purposes and the data exchange between the transmitting user equipment (UE1) and a receiving user equipment (UE2), according to a second realization of the present invention.
Figure 13:
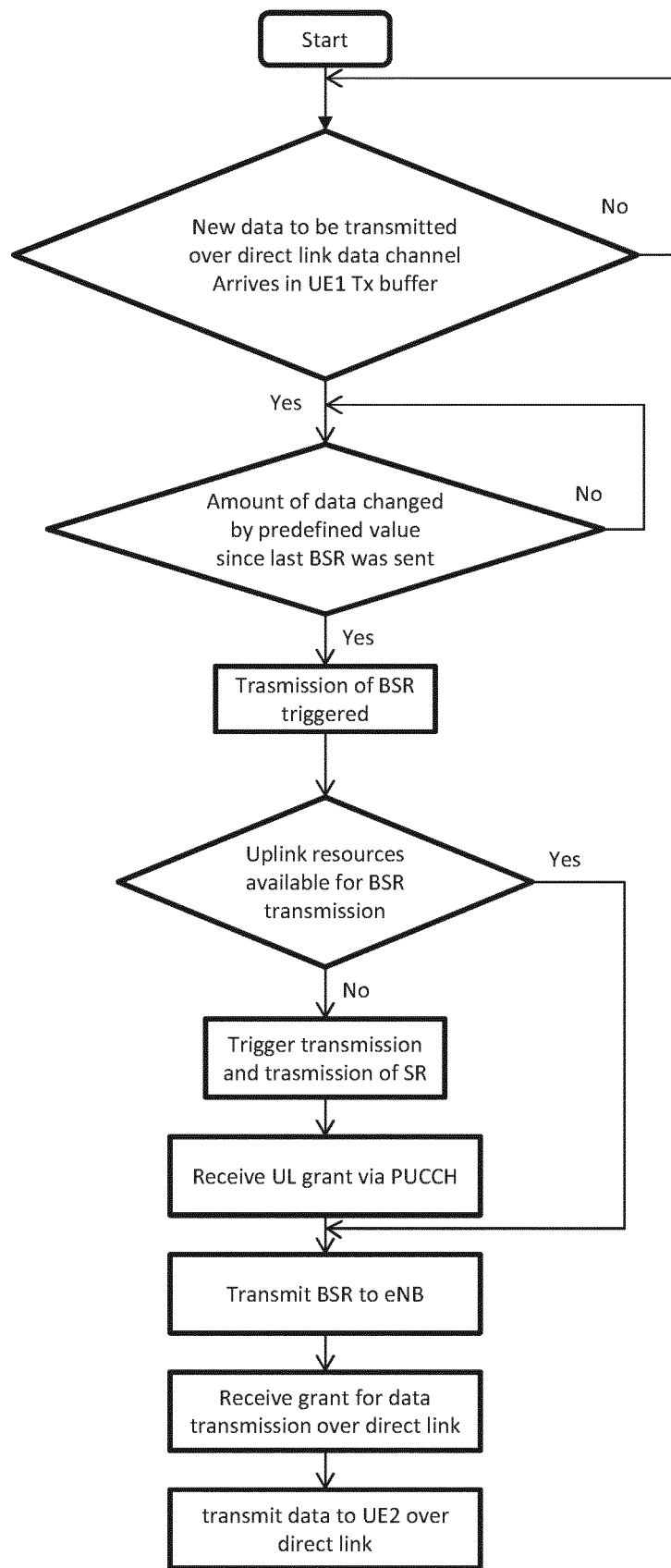
FIG. 13 is a flow chart illustrating the messages exchanged between the transmitting user equipment (UE1) and the base station (eNB) for scheduling purposes and the data exchange between the transmitting user equipment (UE1) and a receiving user equipment (UE2), according to a second realization of the present invention.

FIG. 12, illustrates the transmission buffer at the user equipment and the messages exchanged with the base station to request resources for transmitting data on the D2D direct link data channel. In addition FIG. 12 describes the transmission of the buffer status report on the uplink data channel, and the scheduling request to the eNodeB, and data to the receiving user equipment over the direct link data channel. FIG. 13 illustrates the process at the transmitting user equipment for performing message and data exchange depicted in FIG. 12.

According to the configuration illustrated in FIG. 12, the triggering of the buffer status report/scheduling request for D2D data communication might rely on different conditions compared to the standard triggering. As one example the D2D buffer status report/scheduling request could be triggered only when a certain amount of data has been piled up in the corresponding buffers. Postponing the buffer status report/scheduling request allows that more data arrives in the transmission buffer, and thus uplink transmissions transport more data in less time. Correspondingly, the triggering of the buffer status report/scheduling request is performed when sufficient data is in the transmission buffer, and not immediately when new data arrives in the empty transmission buffer. It is more power efficient to transmit larger Transport Block sizes, rather than transmitting smaller Transport Block sizes.

The configuration of FIG. 12 may be implemented in the following exemplary way. The triggering of a buffer status report in the user equipment depends on two conditions, which shall be both fulfilled. Both trigger conditions in the context of an LTE implementation relate to the transmission of a buffer status report, which, however, directly leads to a transmission of a scheduling request, since it is assumed that no resources are available for the user equipment to transmit the triggered buffer status report; thus, it can be also said that the trigger conditions are defined for the transmission of the scheduling request too.

The first trigger condition requires new data to become available in the transmission buffer, which means that data from higher layers shall be transmitted over the direct link data channel to the receiving user equipment (UE2) and is thus entered into the transmission buffer of the transmitting user equipment (UE1). It should be noted that the first trigger condition is fulfilled independently from whether the transmission buffer is empty or not and independently from the priority of the new data, as long as new data becomes available in the transmission buffer.

This behavior is depicted in FIG. 13, where the transmitting user equipment (UE1) checks whether new data arrives in its transmission buffer.

The second trigger condition is basically responsible for postponing the triggering of the buffer status/scheduling request; it requires that there is enough data in the transmission buffer of UE1. Correspondingly, the data in the transmission buffer shall in general surpass a predetermined threshold.

For the second trigger condition the user equipment checks for example whether the amount of data in the transmission buffer changed of a predetermined value Δd compared to the amount of data stored in the transmission buffer at the time the previous Buffer Status Report was triggered/sent to the eNodeB.

In FIG. 13 it is assumed that the transmitting user equipment checks the second trigger condition requiring the amount of data to change of a predetermined value. Though it appears logical to check the first and second trigger condition in the order as illustrated in FIG. 13, i.e., first the first trigger condition and then the second trigger condition, this is not necessary. The user equipment may also first check the second trigger condition and then the first trigger condition.

It should be also noted that if the second trigger condition (requiring the data amount to change of a predefined value) is fulfilled, this automatically requires that the first trigger condition is fulfilled. In other words, the amount of data in the transmission buffer can only then suddenly change of a predetermined data amount, if new data arrives in the transmission buffer, which corresponds to the requirement of the first trigger condition. Thus, in one alternative, the first trigger condition does not necessarily need to be checked; it suffices to check only the second trigger condition such that the BSR/SR is triggered when the amount of data in the transmission buffer exceeds a certain threshold.

In the example above the transmission of BSR is triggered by the change of the data amount in the transmission buffer of a predetermined amount with respect to the amount of data in the transmission buffer at the time of the previous BSR triggering/transmission. However, other triggering schemes may be used instead of the one described above. Alternatively, the transmission of BSR may be triggered, if the amount of data in the transmission buffer of the transmitting user equipment exceeds a predefined threshold.

A further aspect of the invention relates to the rules for the inclusion/multiplexing of a D2D BSR into a MAC PDU transmitted on PUSCH. According to the current LTE specifications (Rel-8/9/10/11) the UE is only allowed to include at most one BSR MAC CE in a MAC PDU. However, according to one embodiment of the invention a D2D-capable UE is allowed to multiplex one D2D BSR MAC CE and one LTE BSR MAC CE in a MAC PDU which is transmitted on PUSCH to the eNB. This ensures that the regular LTE uplink scheduling procedure is not delayed or impacted due to the D2D scheduling procedure.

In an alternative implementation of the system and method described above, the restriction of including at most one BSR MAC in a MAC PDU may be kept. This alternative implementation would use a structure of the MAC PDU which is similar to that known for standard LTE systems, with the difference that the MAC PDU may include a D2D BSR MAC CE instead of a LTE BRS MAC CE. Such a configuration would result in a delay in the transmission of either the LTE BSR MAC CE or the D2D BSR MAC CE. Further, since only one of the LTE BSR MAC CE and the D2D BSR MAC CE will be included in the MAC PDU, new prioritization rules would need to be defined.

Yet another aspect of the invention is related to the cancellation procedure of a buffer status report. According to the regular buffers status reporting procedure specified in TS36.321 version 11.2.0, section 5.4.5, which is herewith incorporated by reference, all triggered BSRs may be cancelled when a BSR is included in a MAC PDU for transmission. According to a further embodiment of the invention a D2D capable UE may not cancel a regular "LTE buffer status report" when a D2D buffer status report is included in a MAC PDU for transmissions. This solution ensures that the regular LTE uplink scheduling/buffer status reporting procedure is not impacted by the introduction of a D2D buffer status report.

Similarly and according to yet another aspect of the invention the Scheduling Request (SR) prohibit timer may not be started when the scheduling request was triggered only due to the fact that a D2D Buffer status report was triggered. A D2D capable UE may according to a further embodiment of the invention not start the SR prohibit timer when SR has been transmitted on PUCCH for the case that the SR was only sent in order to request transmission resources for a D2D communication. Similarly to the embodiments outline just above a D2D BSR may not delay the LTE data transmission, i.e., in particular high priority LTE data like RRC signaling.

Another aspect of the invention relates to the selection of the resource allocation mode for D2D data communication. As described above there are two modes in which the UE can operate for the resource selection for D2D data communication, i.e., scheduled operation mode (mode1) and autonomous operation mode (mode2). The general principle should be, according to one embodiment, that the eNB controls the resource allocation mode a D2D capable UE operates in. According to one advantageous implementation a D2D capable UE, which has to transmit data of a D2D bearer, may always first operate in mode 1, i.e., establishing an RRC connection to the eNB (for the case of an RRC_IDLE UE) and sending buffer status report/scheduling request to the eNB as outlined in the previous embodiments.

If UE doesn't receive any resource allocation for D2D transmission from the eNB, e.g., within a predefined time window, or alternatively an explicit signaling indication from eNB which indicates the UE to autonomously select D2D time/frequency resource from a resource pool for D2D data transmission, the UE will fall back to mode 2 operation. Alternatively the eNB could signal, e.g., by means of system information broadcasting (SIB), that scheduled mode operation is not supported within this cell. A flag may be for example broadcasted which indicates the availability of mode 1 within this cell. Based on this flag a D2D capable transmitting UE will either first try the mode 1 type of operation (when the flag indicates that mode 1 is operated in the cell) or immediately use mode 2 for the resource allocation for D2D transmissions. Yet another solution may be that some special access classes could be introduced which are reserved for D2D purposes and based on those access classes the eNB could control which D2D UEs are allowed to request resources for D2D data transmission directly from the eNB, i.e., use mode 1 type of operation. Basically each D2D UE would be assigned an access class and some signaling from the eNB will indicate which classes are allowed to use mode 1 for resource allocation.

Still a further aspect of the invention relates to the LCP procedure in UE capable of supporting device-to-device communication. The user equipment may have both LTE channels or bearers for transmitting data over the uplink data channel and D2D bearers. In such a scenario, data of the D2D bearers may be only transmitted in D2D sub-frames or, in other words on resources configured for D2D transmission over the direct link data channel. Similarly, data of the LTE bearers may be only transmitted in LTE-dedicated sub-frames respectively time/frequency resources. Further, a logical channel prioritization procedure may be implemented, which takes into account the UE capability of transmitting over the LTE uplink channel and over the direct link channel.

In an advantageous implementation, a common LCP procedure may be developed for both the LTE and D2D bearers. Accordingly, in LTE sub-frames data of D2D bearers will not be considered for the LCP procedure. In other words, D2D bearers may be considered suspended for the LCP procedure in LTE sub-frames respectively time/frequency resources. Similarly, LTE bearers may be suspended for the LCP operation in D2D sub-frames. Having a common LCP procedure for D2D and for LTE communication, allows reducing the complexity of the management of D2D and LTE bearers.

Alternatively, there may be two separate LCP procedures: one for D2D data transfer over the direct link channel, and one for LTE data traffic. Accordingly, a dedicated LCP procedure for D2D bearers may be invoked for D2D sub-frames whereas the LCP defined for LTE is invoked in those sub-frames which are reserved for LTE only transmissions. Since there is no QoS support for D2D bearers, and therefore no Prioritized Bit Rate (PBR) needs to be set, the D2D LCP procedure in this scheme may not need the use of the token bucket model. The scheme in which two separate LCP procedures for D2D and LTE are given may have the advantage, that the D2D LCP procedure can have an easier configuration.

Still a further aspect of the invention relates to the uplink transmission timing of discovery signals. In general the transmission timing in D2D data transmission will be different than the transmission timing in LTE uplink data transmission. This is due to the fact that in LTE, the timing of a user equipment is always controlled by the network, i.e., by the eNodeB. Specifically, the network controls that all the uplink signals from all the user equipment under the control of the eNodeB are received at the same time, in order to avoid interference. In a system capable of device-to-device communication the transmitting user equipment that transmits data to a receiving user equipment over the direct link data channel has to negotiate some timing with the receiving user equipment (or group of receiving user equipment). The timing negotiated by the transmitting and the receiving user equipment may by different than the network-controlled timing for LTE uplink data traffic. According to a first solution the RRC_Connected D2D transmitting user equipment transmits a discovery signal based on the downlink reference timing also for D2D communication. In LTE systems, the uplink timing is defined as the downlink reference timing plus an offset as correction to the downlink timing. The offset in called timing alignment (TA) factor and its value is controlled by the eNodeB. According to the first solution, the correction value for the uplink will be, therefore, zero (T2=0) for D2D in FDD. In TDD RRC_connected and RRC_idle D2D transmitting user equipment may transmit discovery signal based an offset of 624 Ts. As a result, the downlink timing will be T2=624 Ts.

Since two different timings for LTE and D2D discovery/communication are given, the user equipment in RRC_Connected state may have two separate, independent timing alignment functionalities residing in the MAC layer, which include timing alignment values and or Timing alignment timers: i.e., one for D2D and one for LTE.

Advantageously, uplink timing functionality for D2D may be activated only for D2D sub-frames. In other words, there will be an uplink timing jump between an LTE uplink sub-frame and D2D transmission. In addition, NTA_Ref_D2D for D2D discovery may be set to zero According to a further advantageous aspect, which may be used together or in alternative to the previously described aspects, an autonomous uplink timing adjustment (tracking DL reference timing) may be applied to D2D transmission during D2D sub-frames.

Finally, for D2D communication the user equipment will not receive Timing Advance (TA) commands from eNodeB. Consequently, according to a further advantageous aspect, which may be used together or in alternative to the previously described aspects, a Timing Advance timer for D2D may be given. As an example, a TA timer may be set to infinity for D2D communications and started before the first D2D discovery or transmission occurs.

Another aspect of the invention is related to the discovery procedure for Device-to-Device communication respectively proximity services. In out of coverage, there is no network available and therefore a dedicated or common/resource allocation from the network side is not possible for transmitting/receiving discovery resources. A further embodiment of the present invention addresses the above problem. Accordingly, a D2D capable UE which is not in the coverage of a network, i.e., also referred to as out-of-coverage, may transmit a fixed sequence at a fixed frequency that is repeated periodically with a fixed period. The procedure described above may be implemented by transmitting D2D Primary Synchronization Signals with no device identity or with ProSe UE Identities, on a fixed frequency irrespective of its actual frequency of operation. Such an implementation allows to perform detection by other D2D UEs in a very simple manner.

For D2D capable UEs which are in the coverage of a network, i.e., referred to as in-coverage UEs, the discovery procedure can be distinguished between Idle mode UEs and connected mode UEs, i.e., UEs having established a RRC connection to the network. The two modes will be described in the following.

Idle UE

According to the first in-coverage discovery procedure, both Type1 and Type2 resources in the current cell for D2D discovery messages reception (Rx Pool) may be broadcasted in System Information. In addition, the current cell may also broadcast the Tx Pool from a neighboring cell (and possibly also the out of coverage Tx Pool) which could be on a same or different frequency. The discovery message reception is thus given by:

Rx Pool=Tx Pool of current cell+Tx Pool of neighbor cell(s)+Out of Coverage Tx Pool Alternatively, in some deployments, the Tx Pool of neighbor cell(s) and/or Out Of Coverage TX Pool may not be broadcasted by the current cell, since it might be an operator's choice to save broadcasting and/or since the neighbor cell may belong to a different PLMN, etc. In such a case, the current cell may at least indicate that Rx Pool broadcasted in the current cell may not contain all Tx Pools of interest from outside this cell. In simplest form this could be 1 bit indication (indicated as note1 in the below diagram) in the D2D System information block.

Further, a receiving UE needs to determine if there would be other D2D devices outside this cell, whose discovery message(s) may also be of interest to said receiving UE. Accordingly, said information may be transmitted by a higher layer, e.g., a NAS application (based on, e.g., Prose server). Upon such a determination, that some D2D devices/discovery of interest are unavailable in this cell, the UE will be able to find out the possible neighbor cell(s) where such D2D devices/discovery of interest may be present.

Figure 14:
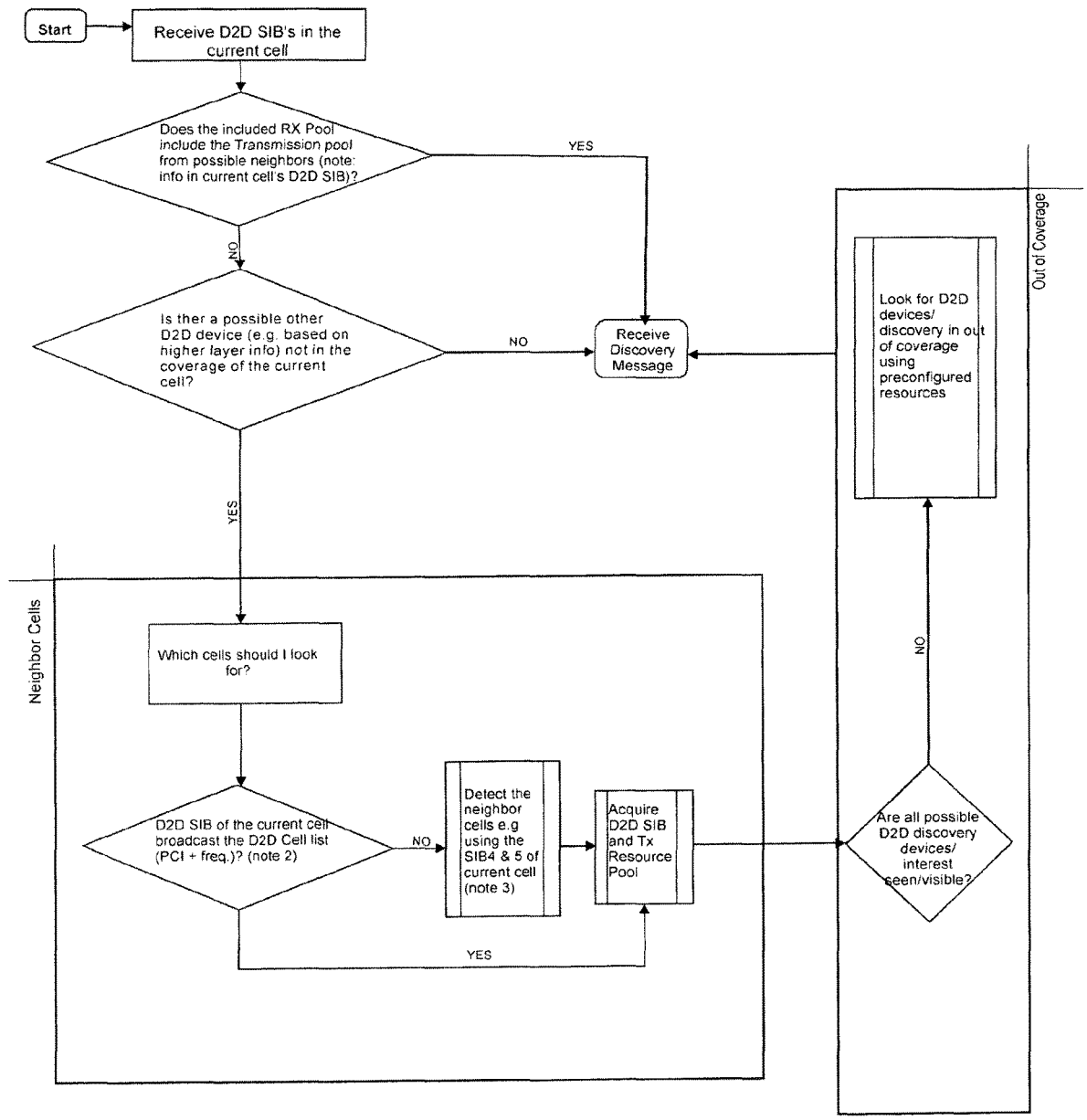
FIG. 14 is a flow chart describing reception of D2D Discovery Signals.

The method for deceiving D2D discovery signals as described above is shown in FIG. 14.

According to an implementation of the D2D capable communication system, the neighbor cells that support D2D discovery (i.e., have allocated certain resources for Type 1 and/or Type 2 resources) may lie on a different frequency. In such a case an indication of both PCI and frequency of neighbor cells may advantageously done in the system information broadcast of the current cell.

Figure 15:
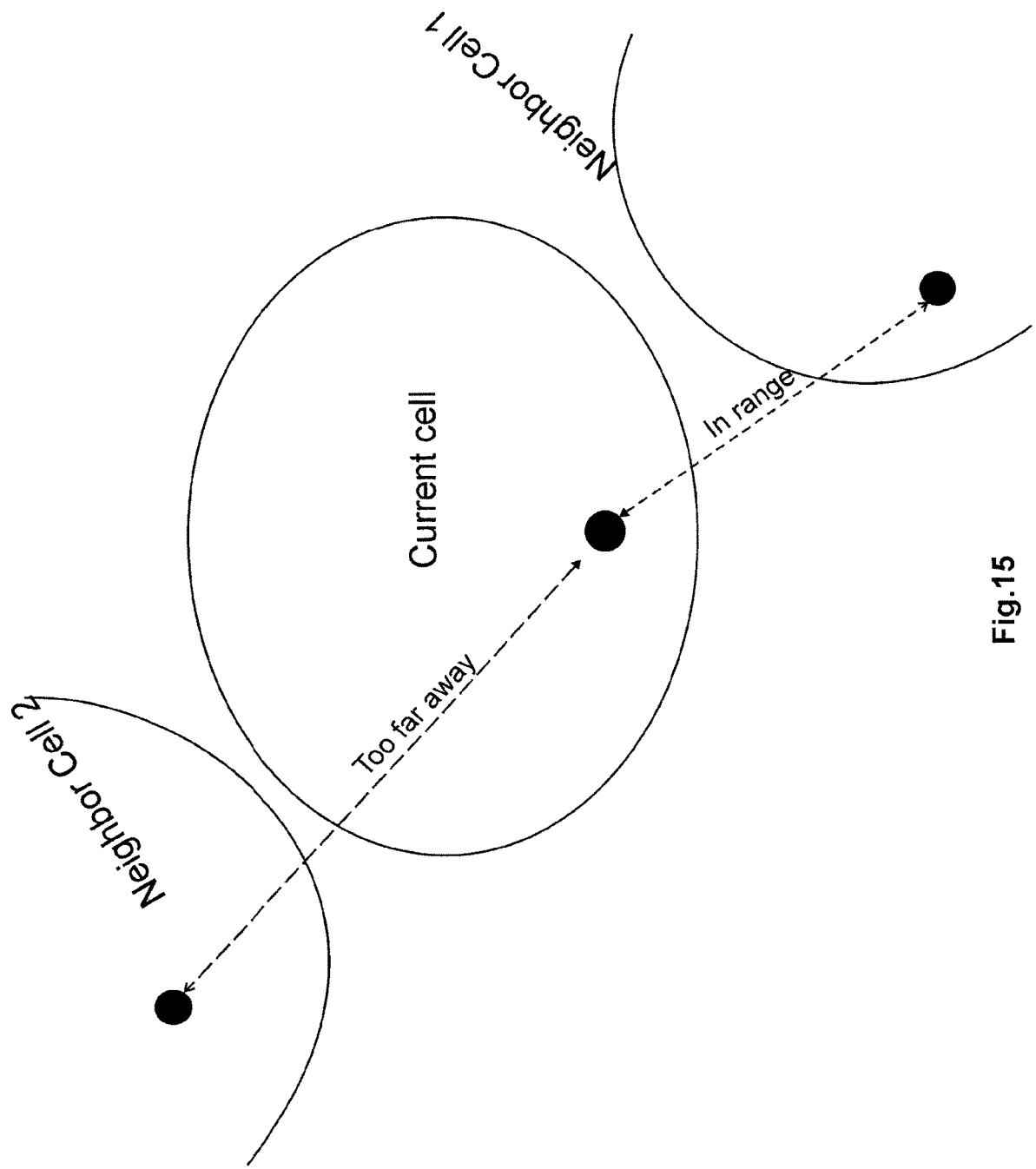
FIG. 15 is a schematic drawing illustrating Neighbor Discovery.

FIG. 15 schematically illustrates a situation in which a D2D capable UE performs discovery in neighboring cells. The discovery transmissions are limited by the maximum Tx power of the transmitting UE and therefore discovery transmissions in far-away cells will not be receivable to this D2D device.

Therefore, according to a further implementation, a D2D device waiting to receive discovery messages from neighboring cell(s) may not need to search/acquire all possible neighbor cells but only that are close to it. As an example, as shown in the below diagram, the D2D device does not try to detect/acquire D2D resources of neighbor cell 2 since any possible transmission from a D2D device in neighbor cell 2 is too far away/unreachable. Advantageously, a UE may try to detect/acquire D2D resources of neighbor cell-x only if certain conditions are fulfilled. Advantageously, the UE may decide whether to detect or acquire D2D resources of a neighboring cell x (cell-x) if:

Current_Cell_Quality−Cell_x_Quality<Threshold1;
or,

Cell_x_Quality>=Current_Cell_Quality

Connected Mode

The information about Rx Pool may be signaled to a UE in connected mode by dedicated signaling (e.g., RRC information). The Rx Pool may include information about Tx Pool of neighbor cell(s) and/or Out Of Coverage TX Pool. Alternatively, the UE may acquire the information as described in relation with the Idle Mode discussed above.

In addition, a connected mode UE may also require Gap patterns to acquire (a) detection of inter frequency neighbor cell(s), and their D2D SI; and (b) the discovery message(s) on inter-frequency resources.

Accordingly, such a UE may ask for Gap pattern from the serving eNB possibly including the information about the possible gaps (gap length, repetition length, offset etc.). Alternatively, such a UE may use autonomous gaps.

As the previous embodiment was mainly focusing on the receiving operation of D2D discovery in the following the transmitting operation for D2D discovery is described according to one exemplary embodiment of the invention.

A D2D capable UE may need to decide between which type of resource it should use to transmit D2D discovery signals/messages. Based on this decision it may need to request resources accordingly at the eNB (e.g., for Type 2B resources) and it may therefore need to establish an RRC connection for this purpose (if the UE was in Idle Mode).

According to an advantageous implementation the decision on the type of resources that should be used to transmit D2D discovery signals or messages may be based on the following criteria:

1) Type of Discovery, i.e., based on Application triggering Discovery transmission
   Mapping between Discover resource type and Application could be specified, pre-configured, indicated by the (Pro-se) Discovery Server etc.;
2) Last successful Discovery Transmission (e.g., For the same Discover application);
3) Idle Mode Mobility State.

Advantageously in one implementation, Slow or stationary UEs may always ask for a particular resource type (e.g., Type 2B); mobile UEs (e.g., Medium mobility) will use, e.g., Type 1. The types of request mentioned above will be explained in the following sections.

Request for Type 2B Resources

If the UE decides to use Type 2B resources, it shall request eNB to have these Type 2B resources granted. This can be accomplished by the following procedures:

Using Special RACH resources (e.g., Preamble, RACH transmission resources);
   A new cause value(s) in msg3 (RRC Connection Request)—to ask for D2D Type 2B Tx resources
   Since the UE does not intend to establish an LTE bearer (e.g., one terminating in the LTE CN) a Light RRC protocol can be used for this purpose, e.g., no security context may need to be established, no measurements configuration/reporting etc.;
   NAS signaling
      UE NAS informs MME, MME verifies and indicates/requests eNb to use Type 2B; eNB grants Type 2B resources to this UE (in RRC Reconfiguration). Application to Resource mapping is fixed and therefore Pro-se server/application/CN decide the resource type to be used, e.g., During Authentication of D2D services.

Additionally, the UE may indicate the estimated length of Type 2B resource usage while requesting for such a resource. If the request is not honored (e.g., UE receives a 2B resource reject message/RRC connection release, or no response within certain time), the UE starts using Type 1.

Mobility (Handover, Re-Establishment)

The mobility will not ensure that the D2D resources allocated previously are still available for use. Then there are following treatment to the allocated D2D resources during mobility:

Kept as it is
      Negotiated on X2; e.g., Neighbors reserve the same physical resources for D2D Discovery transmission
      Reconfigured by target in HO Command/Reestablishment msg.+Reconfig. Msg.;
   De-configured/released as a result of receiving HO Command;
      UE asks for the same after Handover in the target cell (target eNB may allocate same-as-in-previous cell or new resources)

Releasing Discovery Resource Type 2B

According to an advantageous implementation, the dedicated resources (type 2B) may be released by the UE when the same is no longer required (i.e., the UE would not transmit D2D discovery). Alternatively, the eNB may request the resources back (e.g., to avoid congestion in LTE cellular communication). Such a release may be done as described in the following:

Implicit Release
    Upon a timer (configured/specified) expiry
        If the UE wish to retain it (Type 2B resources) further, it needs to send a "keep-alive" signaling to eNB.
    Upon mobility (handover, reestablishment): the UE simply relinquishes the Type 2B resource used in the source cell.
    Upon RRC Connection Release (already decided in RAN2#85): the UE simply relinquishes the Type 2B resource used in the source cell.

Explicit Release
    New Signaling (RRC, MAC CE etc.)
        from UE (initiating release 2B) when it no more needs it;
        from network (initiating release 2B) in case of congestion in LTE (overlay) network.

Upon network initiating the release of Type 2B resources, UE may start using Type 1 resources, if it still needs to transmit discovery messages/signals.

D2D Related System Information Broadcast (SIB)

A D2D SIB is the broadcast of information pertaining to D2D discovery in the underlay network. This information may not be used/useful to UEs only interested in the overlay (LTE) network. The network may broadcast information related to D2D (called D2D SIB(s)) in separate System Information Blocks (SIB). Same or different SIBs may indicate the D2D resources for Receiving Inter cell Discovery messages.

Receiving Resources in Current Cell=Transmitting Resources in Current Cell+Transmitting Resources from Neighbor Cell Change of D2D SIBs A new paging message could be used (New D2D P-RNTI) which carries information about D2D SIB modification. Alternatively, Timer based (not change more frequently than 'x' ms.) mechanism can be used such that the interested D2D device must re-acquire the D2D SIB (only) at timer expiry. As another alternative, a D2D SIB modification may impact the value tag in SIB1 as today or may even have its own value tag.

Hardware and Software Implementation of the Invention

Another aspect of the invention relates to the implementation of the above described various embodiments and aspects using hardware and software. In this connection the invention provides a user equipment (mobile terminal) and a eNodeB (base station). The user equipment is adapted to perform the methods described herein. Furthermore, the eNodeB comprises means that enable the eNodeB to evaluate the IPMI set quality of respective user equipment from the IPMI set quality information received from the user equipment and to consider the IPMI set quality of the different user equipment in the scheduling of the different user equipment by its scheduler.

It is further recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A base station comprising:
    a receiver, which, in operation, receives from a communication apparatus a direct link Buffer Status Report (BSR) for a device to device (D2D) communication, wherein the direct link BSR is a message that informs the base station of an amount of D2D data to be transmitted from the communication apparatus to a destination user equipment; and
    a transmitter, which, in operation, transmits to the communication apparatus a D2D grant that schedules D2D resources for the D2D data,
    wherein the direct link BSR has a lower priority in resource scheduling than an uplink BSR, the uplink BSR being a message that informs the base station of an amount of uplink data to be transmitted from the communication apparatus to the base station, and
    wherein the direct link BSR has a higher priority in resource scheduling than data from any logical channel, except data from Uplink Common Control Channel (UL-CCCH).

2. The base station according to claim 1, wherein the direct link BSR is transmitted in a direct link BSR MAC control element with an index identifying a type of the D2D data and/or with a MAC header that includes a logical channel ID.

3. The base station according to claim 1, wherein the D2D resources are a set of subframes for the D2D communication.

4. The communication apparatus according to claim 1, wherein the direct link BSR indicates the amount of D2D data and is transmitted in a MAC Protocol Data Unit (PDU) with a logical channel ID and one or more additional pieces of information which are not included in the uplink BSR and are related to the D2D communication.

5. The base station according to claim 1, wherein the receiver, in operation, receives from the communication apparatus a Scheduling Request (SR) requesting resources for the direct link BSR.

6. The base station according to claim 1, wherein the direct link BSR is a first type of direct link BSR or a second type of direct link BSR that is shorter in data length than the first type of direct link BSR.

7. The base station according to claim 1, wherein at most one (1) direct link BSR MAC control element including the direct link BSR and one (1) BSR MAC control element including the uplink BSR are transmitted in a MAC Protocol Data Unit (PDU).

8. The base station according to claim 1, wherein the direct link BSR is transmitted on Uplink Shared Channel (UL-SCH) resources, which are different from the D2D resources.

9. The base station according to claim 1, wherein the uplink BSR is transmitted in a MAC Protocol Data Unit (PDU) even when both of the uplink BSR and the direct link BSR are triggered.

10. The base station according to claim 1, wherein one uplink BSR and one direct link BSR are transmitted in a MAC Protocol Data Unit (PDU) even when both of the uplink BSR and the direct link BSR are triggered.

11. A communication method comprising:
receiving from a communication apparatus a direct link BSR, wherein the direct link Buffer Status Report (BSR) is a message that informs the base station of an amount of D2D data to be transmitted from the communication apparatus to a destination user equipment; and
transmitting to the communication apparatus a D2D grant that schedules D2D resources for the D2D data;
wherein the direct link BSR has a lower priority in resource scheduling than an uplink BSR, the uplink BSR being a message that informs the base station of an amount of uplink data to be transmitted from the communication apparatus to the base station, and
wherein the direct link BSR has a higher priority in resource scheduling than data from any logical channel, except data from Uplink Common Control Channel (UL-CCCH).

12. The communication method according to claim 11, wherein the direct link BSR is transmitted in a direct link BSR MAC control element with an index identifying a type of the D2D data and/or with a MAC header that includes a logical channel ID.

13. The communication method according to claim 11, wherein the D2D resources are a set of subframes for the D2D communication.

14. The communication method according to claim 11, wherein the direct link BSR indicates the amount of D2D data and is transmitted in a MAC Protocol Data Unit (PDU) with a logical channel ID and one or more additional pieces of information which are not included in the uplink BSR and are related to the D2D communication.

15. The communication method according to claim 11, comprising receiving from the communication apparatus a Scheduling Request (SR) requesting resources for the direct link BSR.

16. The communication method according to claim 11, wherein the direct link BSR is a first type of direct link BSR or a second type of direct link BSR that is shorter in data length than the first type of direct link BSR.

17. The communication method according to claim 11, wherein at most one (1) direct link BSR MAC control element including the direct link BSR and one (1) BSR MAC control element including an uplink BSR are transmitted in a MAC Protocol Data Unit (PDU).

18. The communication method according to claim 11, wherein the direct link BSR is transmitted on Uplink Shared Channel (UL-SCH) resources, which are different from the D2D resources.

19. The communication method according to claim 11, wherein the uplink BSR is transmitted in a MAC Protocol Data Unit (PDU) even when both of the uplink BSR and the direct link BSR are triggered.

20. The communication method according to claim 11, wherein one uplink BSR and one direct link BSR are transmitted in a MAC Protocol Data Unit (PDU) even when both of the uplink BSR and the direct link BSR are triggered.

* * * * *